United States Patent
Joseph et al.

(10) Patent No.: US 7,798,421 B2
(45) Date of Patent: *Sep. 21, 2010

(54) APPARATUS FOR SPRAYING LIQUIDS, AND DISPOSABLE CONTAINERS AND LINERS SUITABLE FOR USE THEREWITH

(75) Inventors: Stephen C. P. Joseph, Warwickshire (GB); Malcolm F. Douglas, Wales (GB); Alan F. Butler, Warwickshire (GB); David R. Bastow, Staffordshire (GB); Jerry E. Salhus, Bloomington, MN (US); Margaret A. Hartfel, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/932,511

(22) Filed: Oct. 31, 2007

(65) Prior Publication Data

US 2008/0054087 A1 Mar. 6, 2008

Related U.S. Application Data

(60) Continuation of application No. 11/277,298, filed on Mar. 23, 2006, now Pat. No. 7,374,111, which is a division of application No. 10/881,291, filed on Jun. 30, 2004, which is a continuation of application No. 09/508,883, filed as application No. PCT/US98/00796 on Jan. 14, 1998, now Pat. No. 6,820,824.

(30) Foreign Application Priority Data

Jan. 24, 1997 (GB) .................................. 9701447.6
Jun. 18, 1997 (GB) .................................. 9712784.9

(51) Int. Cl.
*A62C 5/02* (2006.01)

(52) U.S. Cl. ........................... 239/8; 239/346; 239/345; 239/600; 239/379; 239/328; 239/327; 239/318; 239/525; 220/495.02; 220/495.06; 141/2

(58) Field of Classification Search ................. 239/345, 239/376, 346, 309, 327, 362, 590, 8, 600, 239/379, 328, 318, 525; 220/495.02, 495.06; 141/2

See application file for complete search history.

(56) References Cited

U.S. PATENT DOCUMENTS 533,489 A 2/1895 Ogram (Continued)

FOREIGN PATENT DOCUMENTS

AU 2000 32550 7/2000

(Continued)

OTHER PUBLICATIONS

Service Bulletin, SB-4-043-D Replaces SB-4-043 C, Devilbiss, "120175 (GFC-502) 32 OZ. Aluminum Gravity Feed Cup with Disposable Lid and Cup Liner", May 2000.

(Continued)

*Primary Examiner*—Dinh Q Nguyen
(74) *Attorney, Agent, or Firm*—Steven E. Skolnick

(57) ABSTRACT

A spray gun (1) has a fluid reservoir (11) with a removable liner (13) received in a container (12) having a detachable lid (15). The liner (13), which may be thermo/vacuum-formed from a planar material, has a shape that corresponds to and is a close fit within the interior of the container (12) and collapses as fluid is withdrawn from within the liner (13) during operation of the spray gun (1). The lid (15) has an outlet (16) connected to an inlet on the spray gun (1) for transfer of liquid from the reservoir (11) to the spray gun (1) and the container (12) has a vent (12A) in the base end for admitting air between the container (12) and the liner (13) as liquid is withdrawn from within the liner (13).

5 Claims, 12 Drawing Sheets

U.S. PATENT DOCUMENTS

| | | | |
|---|---|---|---|
| 1,556,913 A | 10/1925 | Capra | |
| 1,703,384 A | 2/1929 | Birkenmaier | |
| 1,843,269 A | 2/1932 | Capser | |
| 2,051,518 A | 8/1936 | Cunningham | |
| 2,177,032 A | 10/1939 | Baumgardner | |
| 2,228,861 A | 1/1941 | Wegener | |
| 2,593,639 A | 4/1952 | Whitehouse | |
| 2,606,586 A | 8/1952 | Hill | |
| 2,612,404 A | 9/1952 | Andersson | |
| 2,851,187 A | 9/1958 | Hall | |
| 3,035,623 A | 5/1962 | Goetz | |
| 3,066,872 A | 12/1962 | Kobee | |
| 3,134,494 A | 5/1964 | Quinn | |
| 3,157,360 A | 11/1964 | Heard | |
| 3,198,438 A | 8/1965 | Hultgren | |
| 3,211,324 A | 10/1965 | Sapien | |
| 3,227,305 A | 1/1966 | Enssle | |
| 3,236,459 A | 2/1966 | McRitchie | |
| 3,240,398 A | 3/1966 | Dalton | |
| 3,255,972 A | 6/1966 | Hultgren et al. | |
| 3,335,913 A | 8/1967 | Bernard | |
| 3,381,845 A | 5/1968 | MacDonald | |
| 3,393,842 A | 7/1968 | Bruce et al. | |
| 3,401,842 A | 9/1968 | Morrison | |
| 3,432,104 A * | 3/1969 | Kaltenbach | 239/328 |
| 3,507,309 A | 4/1970 | Johnson | |
| 3,593,921 A | 7/1971 | Boltic | |
| 3,672,645 A | 6/1972 | Terrels et al. | |
| 3,674,074 A | 7/1972 | Lavis | |
| 3,757,718 A | 9/1973 | Johnson | |
| 3,773,211 A | 11/1973 | Bridgman | |
| 3,776,408 A | 12/1973 | Wald | |
| 3,780,950 A | 12/1973 | Brennan | |
| 3,784,039 A | 1/1974 | Marco | |
| 3,790,017 A | 2/1974 | Fitzpatrick et al. | |
| 3,790,021 A | 2/1974 | Bailey | |
| 3,934,746 A | 1/1976 | Lilja | |
| 3,939,842 A | 2/1976 | Harris | |
| 3,940,052 A | 2/1976 | McHugh | |
| 4,035,004 A | 7/1977 | Hengesbach | |
| 4,043,510 A | 8/1977 | Morris | |
| 4,067,499 A | 1/1978 | Cohen | |
| 4,122,973 A | 10/1978 | Ahern | |
| 4,140,279 A | 2/1979 | Hawkins | |
| 4,151,929 A | 5/1979 | Sapien | |
| 4,186,783 A | 2/1980 | Brandt | |
| 4,193,506 A | 3/1980 | Trindle et al. | |
| D257,668 S | 12/1980 | Ahern | |
| 4,258,862 A | 3/1981 | Thorsheim | |
| 4,321,922 A | 3/1982 | Deaton | |
| 4,339,046 A | 7/1982 | Coen | |
| 4,347,948 A | 9/1982 | Hamada et al. | |
| 4,379,455 A | 4/1983 | Deaton | |
| 4,383,635 A | 5/1983 | Yotoriyama | |
| 4,388,044 A | 6/1983 | Wilkinson | |
| 4,403,738 A | 9/1983 | Kern | |
| 4,406,406 A | 9/1983 | Knapp | |
| 4,455,140 A | 6/1984 | Joslin | |
| 4,516,693 A | 5/1985 | Gaston | |
| 4,558,792 A | 12/1985 | Cabernoch et al. | |
| 4,559,140 A | 12/1985 | Croteau | |
| 4,562,965 A | 1/1986 | Ihmels et al. | |
| 4,586,628 A | 5/1986 | Nittel | |
| 4,633,052 A | 12/1986 | Beavers et al. | |
| 4,645,097 A | 2/1987 | Kaufman | |
| 4,657,151 A | 4/1987 | Cabernoch | |
| 4,712,739 A | 12/1987 | Bihn | |
| 4,760,962 A | 8/1988 | Wheeler | |
| 4,781,311 A | 11/1988 | Dunning et al. | |
| 4,811,904 A * | 3/1989 | Ihmels et al. | 239/345 |
| 4,813,556 A | 3/1989 | Lawrence | |
| 4,836,764 A | 6/1989 | Parkinson | |
| 4,930,644 A | 6/1990 | Robbins, III | |
| 4,936,511 A | 6/1990 | Johnson et al. | |
| 4,946,558 A | 8/1990 | Salmon | |
| 4,951,875 A | 8/1990 | Devey | |
| 4,971,251 A | 11/1990 | Dobrick et al. | |
| 4,998,696 A | 3/1991 | Desjardins | |
| 5,035,339 A | 7/1991 | Meyersburg | |
| 5,059,319 A | 10/1991 | Welsh | |
| 5,060,816 A | 10/1991 | Robbins, III | |
| 5,069,389 A | 12/1991 | Bitsakos | |
| 5,094,543 A | 3/1992 | Mursa | |
| 5,102,384 A | 4/1992 | Ross et al. | |
| 5,123,571 A | 6/1992 | Rebeyrolle et al. | |
| 5,143,242 A | 9/1992 | Millasich | |
| 5,143,294 A | 9/1992 | Lintvedt | |
| 5,186,828 A | 2/1993 | Mankin | |
| 5,209,365 A | 5/1993 | Wood | |
| 5,209,501 A | 5/1993 | Smith | |
| 5,236,128 A | 8/1993 | Morita et al. | |
| 5,236,506 A | 8/1993 | Mazakas | |
| 5,238,150 A | 8/1993 | Williams | |
| 5,261,751 A | 11/1993 | Heinz | |
| 5,326,001 A | 7/1994 | Holmquist et al. | |
| 5,328,095 A | 7/1994 | Wickenhaver | |
| 5,337,921 A | 8/1994 | Wilson et al. | |
| 5,368,395 A | 11/1994 | Crimmins | |
| 5,385,251 A | 1/1995 | Dunn | |
| 5,421,489 A | 6/1995 | Holzner | |
| 5,424,086 A | 6/1995 | Walker | |
| 5,454,488 A | 10/1995 | Geier | |
| 5,460,289 A | 10/1995 | Gemmell | |
| 5,492,242 A | 2/1996 | Gall | |
| 5,501,397 A | 3/1996 | Holt | |
| 5,582,350 A | 12/1996 | Kosmyna et al. | |
| 5,607,082 A | 3/1997 | Cracauer | |
| 5,617,972 A | 4/1997 | Morano et al. | |
| 5,655,714 A | 8/1997 | Kieffer et al. | |
| D386,654 S | 11/1997 | Kosmyna | |
| 5,789,684 A | 8/1998 | Masek et al. | |
| 5,797,520 A | 8/1998 | Donahue | |
| 5,803,302 A | 9/1998 | Sato et al. | |
| 5,803,367 A | 9/1998 | Heard et al. | |
| 5,806,711 A | 9/1998 | Morano et al. | |
| 5,816,501 A | 10/1998 | LoPresti et al. | |
| 5,829,588 A | 11/1998 | Bloomfield | |
| 5,853,102 A | 12/1998 | Jarrett | |
| 5,996,427 A | 12/1999 | Masek et al. | |
| 6,019,294 A | 2/2000 | Anderson et al. | |
| 6,027,041 A | 2/2000 | Evans | |
| 6,053,429 A | 4/2000 | Chang | |
| 6,092,740 A | 7/2000 | Liu | |
| 6,196,410 B1 | 3/2001 | Hocking | |
| 6,257,429 B1 | 7/2001 | Kong | |
| 6,371,385 B1 | 4/2002 | Schiller et al. | |
| 6,536,684 B1 | 3/2003 | Wei | |
| 6,536,687 B1 * | 3/2003 | Navis et al. | 239/345 |
| 6,588,681 B2 | 7/2003 | Rothrum | |
| 6,595,441 B2 | 7/2003 | Petrie et al. | |
| 6,698,670 B1 | 3/2004 | Gosis et al. | |
| 6,712,292 B1 | 3/2004 | Gosis et al. | |
| 6,820,824 B1 * | 11/2004 | Joseph et al. | 239/346 |
| 6,877,677 B2 * | 4/2005 | Schmon et al. | 239/346 |
| 6,938,836 B2 | 9/2005 | Bouic | |
| 6,945,429 B2 * | 9/2005 | Gosis et al. | 222/105 |
| 6,958,033 B1 | 10/2005 | Malin | |
| 7,086,549 B2 | 8/2006 | Kosmyna et al. | |
| 7,143,960 B2 | 12/2006 | Joseph et al. | |
| 7,188,785 B2 | 3/2007 | Joseph et al. | |
| 7,374,111 B2 * | 5/2008 | Joseph et al. | 239/8 |
| 2004/0256484 A1 | 12/2004 | Joseph et al. | |
| 2004/0256485 A1 | 12/2004 | Joseph et al. | |
| 2005/0029285 A1 | 2/2005 | Gay, III et al. | |

| | | | |
|---|---|---|---|
| 2005/0156058 A1 | 7/2005 | Kosmyna et al. | |
| 2005/0241722 A1 | 11/2005 | Pendleton et al. | |
| 2005/0242107 A1 | 11/2005 | Kosmyna et al. | |
| 2005/0258271 A1 | 11/2005 | Kosmyna et al. | |
| 2005/0263614 A1 | 12/2005 | Kosmyna et al. | |
| 2005/0279748 A1 | 12/2005 | Kosmyna | |
| 2006/0000927 A1 | 1/2006 | Ruda | |
| 2006/0017286 A1 | 1/2006 | Kosmyna et al. | |
| 2006/0065591 A1 | 3/2006 | Joseph | |
| 2006/0151630 A1 | 7/2006 | Joseph et al. | |
| 2006/0175433 A1 | 8/2006 | Escoto et al. | |

FOREIGN PATENT DOCUMENTS

| | | |
|---|---|---|
| AU | 199935838 A1 | 1/2001 |
| AU | 2004/202537 | 1/2005 |
| CA | 963436 | 2/1975 |
| CA | 965388 | 4/1975 |
| CA | 1 006 450 | 3/1977 |
| CA | 1 192 852 | 9/1985 |
| CA | 2099763 | 7/1992 |
| CA | 2569369 | 7/1998 |
| CH | 540 159 A | 2/1972 |
| CH | 688082 A | 5/1997 |
| DE | 2412743 | 9/1975 |
| DE | 29 00 998 A1 | 7/1980 |
| DE | 3346165 | 7/1985 |
| DE | 3439442 A | 4/1986 |
| DE | 3517122 C1 | 5/1986 |
| DE | 3507 734 A1 | 9/1986 |
| DE | 8807118 U1 | 8/1988 |
| DE | 41 02 326 A1 | 7/1992 |
| DE | 42 09 258 A1 | 9/1993 |
| DE | 196 18 514 A1 | 11/1997 |
| DE | 299 05 100 U1 | 6/1999 |
| DE | 201 17 496 U1 | 2/2002 |
| DE | 202004003116 U1 | 8/2005 |
| DE | 202004003376 U1 | 8/2005 |
| DE | 202004006907 U1 | 10/2005 |
| EP | 0 388 696 | 3/1990 |
| EP | 0 388 199 | 9/1990 |
| EP | 0 636 548 A1 | 2/1995 |
| EP | 0 678 334 A2 | 10/1995 |
| EP | 0 689 825 A1 | 1/1996 |
| EP | 0 536 344 | 10/1997 |
| EP | 0 987 060 A1 | 3/2000 |
| EP | 1 424 135 | 6/2004 |
| EP | 1 435 265 A2 | 7/2004 |
| EP | 1 566 223 A2 | 8/2005 |
| FR | 1.282.085 | 1/1962 |
| FR | 2 631 254 | 11/1989 |
| FR | 2 639 324 A | 5/1990 |
| FR | 2 798 868 A | 3/2001 |
| GB | 2 103 173 A | 2/1983 |
| GB | 2170471 A | 8/1986 |
| GB | 2303087 | 2/1997 |
| JP | 64-27659 | 1/1989 |
| JP | JUM3-81879 | 8/1991 |
| JP | JUM 05-39671 U | 5/1993 |
| JP | 6-328014 | 11/1994 |
| JP | 6-335643 | 12/1994 |
| JP | 7-289956 | 11/1995 |
| JP | A 08-133338 | 5/1996 |
| JP | JUM 3027372 | 5/1996 |
| JP | 8-192851 | 7/1996 |
| JP | 10-7170 A | 1/1998 |
| JP | 11-028394 | 2/1999 |
| JP | 2001-252599 | 9/2001 |
| WO | WO 92/11930 | 7/1992 |
| WO | WO 92/14437 | 9/1992 |
| WO | WO 95/11170 | 4/1995 |
| WO | WO 98/00796 | 1/1998 |
| WO | WO 98/32539 | 7/1998 |
| WO | WO 99/06301 | 2/1999 |
| WO | WO 99/50153 | 10/1999 |
| WO | WO 00/30844 | 6/2000 |
| WO | WO 02/085533 A1 | 10/2002 |
| WO | WO 03/045575 A1 | 6/2003 |
| WO | WO 2004/082848 A1 | 9/2004 |
| WO | WO 2005/077543 A1 | 8/2005 |
| WO | WO 2005/115631 A1 | 12/2005 |
| WO | WO 2005/120718 A1 | 12/2005 |
| WO | WO 2006/002497 A1 | 1/2006 |

OTHER PUBLICATIONS

Defendant's Prior Art Statement, *3M Innovative Properties Company and 3M Company* vs. *Illinois Tool Works, Inc. and ITW Finishing LLC*, Case No. 06-2459 [U.S. District Court, District of Minnesota] filed Apr. 2, 2007 [12 pages].

Falkman, M.A., Plastic Discs Scrap Waste for Disposable Containers, Packaging Digest, Jun. 1996.

Complaint and Demand for Jury Trial, *3M Innovative Properties Company and 3M Company* vs. *Illinois Tool Works, Inc. and ITW DeVilbiss*, Case No. 06-2459 (U.S. District Court, District of Minnesota), filed Jun. 16, 2006 (29 pgs.).

Amended Complaint and Demand for Jury Trial, *3M Innovative Properties Company and 3M Company* vs. *Illinois Tool Works, Inc. and ITW Finishing, LLC*, Case No. 06-2459 (U.S. District Court, District of Minnesota) filed Aug. 7, 2006 (5 pgs.).

Answer and Counter-Claim to amended Complaint, *3M Innovative Properties Company and 3M Company* vs. *Illinois Tool Works, Inc. and ITW Finishing, LLC*, Case No. 06-2459 (U.S. District Court, District of Minnesota) filed Aug. 21, 2006 (8 pgs.).

Notice of Opposition and Grounds of Opposition to European Patent No. EP 0954381, *Illinois Tool Works, Inc.* vs *3M Company*, dated Jun. 19, 2006, 23 pgs.

Service Bulletin; SB-21-041-B, replaces SB-21-041-A, PT-500, 510, and 520 2 ½ Gallon Pressure Tank, 1987.

DeVilbuss Industrial Distributor Net Price List Spray Equipment, DDP-104, Supplement 1, Oct. 1, 1988.

DeVibiss Products PT-500, 510 and 520 2 ½ Gallon Pressure Tank, Oct. 1998.

DeVilbiss PT-500, 510 and 520 2 ½ Gallon Pressure Tank service bulletin—SB-21-014B.

SATA Jet 90, Operating Instructions, SATA-Fabspritztechnik GmbH & Co.

Complaint and Demand for Jury Trial, *3M Innovative Properties Company and 3M Company* vs. *Louis M. Gerson Co, Inc., and Gerson Professional Products, Inc.*, Civil No. 08-04960 JRT-FLN (U.S. District Court, District of Minnesota), filed Aug. 19, 2008 (30 pages).

Answer of Defendants Demand for Jury Trial, *3M Innovative Properties Company and 3M Company* vs. *Louis M. Gerson Co, Inc., and Gerson Professional Products, Inc.*, Civil No. 08-04960 JRT-FLN (U.S. District Court, District of Minnesota), filed Oct. 15, 2008 (4 pages).

Louis M. Gerson Co., Inc. and Gerson Professional Products, Inc. Answers to 3M's First Set of Interrogatories to Gerson (Nos. 1-22), *3M Innovative Properties Company and 3M Company* vs. *Louis M. Gerson Co, Inc., and Gerson Professional Products, Inc.*, Civil No. 08-04960 JRT-FLN (U.S. District Court, District of Minnesota), filed Dec. 11, 2008 (14 pages).

Plaintiffs' Claim Chart, *3M Innovative Properties Company and 3M Company* vs. *Louis M. Gerson Co, Inc., and Gerson Professional Products, Inc.*, Civil No. 08-04960 JRT-FLN (U.S. District Court, District of Minnesota), filed Feb. 2, 2009 (52 pages).

Defendants' Claim Chart, *3M Innovative Properties Company and 3M Company* vs. *Louis M. Gerson Co, Inc., and Gerson Professional Products, Inc.*, Civil No. 08-04960 JRT-FLN (U.S. District Court, District of Minnesota), filed Mar. 2, 2009 (140 pages).

Defendants' Prior Art Statement, *3M Innovative Properties Company and 3M Company* vs. *Louis M. Gerson Co, Inc., and Gerson Professional Products, Inc.*, Civil No. 08-04960 JRT-FLN (U.S. District Court, District of Minnesota), filed Mar. 2, 2009 (46 pages).

Plaintiffs' Prior Art Statement, *3M Innovative Properties Company and 3M Company* vs. *Louis M. Gerson Co, Inc., and Gerson Professional Products, Inc.*, Civil No. 08-04960 JRT-FLN (U.S. District Court, District of Minnesota), filed Apr. 1. 2009 (25 pages).

Defendants' Identification of Claim Terms, Phrases or Clauses That May Require Court Construction, *3M Innovative Properties Company and 3M Company* vs. *Louis M. Gerson Co, Inc., and Gerson Professional Products, Inc.*, Civil No. 08-04960 JRT-FLN (U.S. District Court, District of Minnesota), filed Apr. 6, 2009 (3 pages).

\* cited by examiner

APPARATUS FOR SPRAYING LIQUIDS, AND DISPOSABLE CONTAINERS AND LINERS SUITABLE FOR USE THEREWITH

CROSS REFERENCE TO RELATED APPLICATIONS

This application is a continuation of prior U.S. Ser. No. 11/277,298, filed on Mar. 23, 2006 now U.S. Pat. No. 7,374,111 which is a divisional of U.S. Ser. No. 10/881,291, filed Jun. 30, 2004; which was a continuation of U.S. Ser. No. 09/508,883, filed Jul. 23, 1999, now U.S. Pat. No. 6,820,824 now issued; which was a national stage filing under 35 U.S.C. 371 of PCT/US98/00796, filed Jan. 14, 1998, which International Application was published by the International Bureau in English on Jul. 30, 1998; which claims priority to GB 9701447.6, filed Jan. 24, 1997, and GB 9712784.9, filed Jun. 18, 1997; the disclosure of which is herein incorporated by reference.

The present invention relates to containers, more especially, disposable containers and to containers which can function as liners. The invention also relates to apparatus for spraying liquids (for example, spray guns) and, more especially, to the liquid containers or reservoirs of such apparatus.

There are many uses, in many different fields, for disposable containers. For example, many goods are packaged in disposable containers (e.g. bags) either before or after purchase. When the disposable container is a plastic bag, it will often be re-used by the purchaser as a disposable liner for another receptacle, for example a refuse bin. In some cases, disposable liners are produced specifically for use in other, re-usable, receptacles: in those cases, the liner may be intended to aid disposal of the contents of the receptacle (as in the case of a liner in a refuse bin); to protect the receptacle or its contents; or to facilitate, or even eliminate, the cleaning of the receptacle.

The use of a liner in a receptacle in which a substance like glue, paint or plaster is mixed or contained for use can be particularly advantageous, in terms of facilitating the cleaning of the receptacle after use and of preventing substances in the receptacle from being contaminated by the remains of other substances. Receptacles in which paints are mixed or contained for use, for example, must be clean to ensure that the colour or quality of the paint is not altered by traces of other substances: that is particularly important, as explained above, when a vehicle is being re-painted and the paint is required to match an existing one. To avoid contamination problems when mixing paints, it is often the practice in vehicle body shops to use disposable waxed paper cups as mixing containers, particularly when only a small amount of paint is required. An alternative approach, proposed in U.S. Pat. No. 4,383,635, involves the provision of a disposable container which, for use, is located in a re-usable frame-like receptacle.

In the field of spray guns, it has been proposed for various reasons that a disposable liner should be used in the reservoir of the gun (see U.S. Pat. Nos. 3,211,324, 3,255,972, 4,151,929, 4,951,875 and 5,143,294, and EP-A-0 678 334). Guns for spraying liquids (e.g. paints, garden chemicals etc.) are generally well known and typically comprise a reservoir in which a liquid to be dispensed is contained, and a spray nozzle through which the liquid is dispensed, under pressure, under the control of a trigger mechanism. The liquid may be fed from the reservoir under gravity and/or it may be entrained in a stream of pressurized fluid, for example air or water, which is supplied to the gun from an external source.

When a user wishes to change the liquid in the reservoir of a spray gun, it is usually necessary to clean the gun very thoroughly to ensure that no traces of the old liquid remain in the gun to contaminate the new liquid. That applies particularly to paint spray guns because any traces of an old batch of paint remaining in a gun may affect the colour of a new batch of paint to the extent that the new batch of paint becomes useless. This can cause problems especially in vehicle body shops where the paint applied to a vehicle is often required to match existing paint work exactly. Alternatively, if paint residues have been allowed to dry within the gun, they may flake and contaminate the new batch of paint. The cleaning of spray guns is, however, a comparatively complex and time consuming operation. Moreover, in the case of paint spray guns, the cleaning operation involves the use of comparatively large amounts of solvents which, for environmental reasons, should be handled and disposed of with care. That, in turn, can add substantially to the cost of a painting operation. It has already been suggested (see, for example, EP-A-0 678 334 mentioned above) that the use of a disposable liner in the paint reservoir (i.e. the paint pot) of a spray gun can simplify the cleaning of the gun and reduce the amount of solvent required.

The present invention is concerned with the provision of a container which is sufficiently inexpensive to be disposable and which can preferably be collapsed when it is to be disposed of but which, nevertheless, is comparatively easy to handle and to fill when in use. The invention is concerned, more especially, with the provision of such a container which is suitable for use as a liner in another receptacle. The present invention is also concerned with enabling the cleaning of spray guns and like apparatus to be simplified, and with thereby enabling the time and expense associated with that operation to be reduced.

The present invention provides a container comprising side walls and a comparatively-rigid base thermo/vacuum-formed from a plastics material; wherein the side walls are thin in comparison to the base and are collapsible, but the container is capable of standing, unsupported, on the base with the side walls extended and upright.

More especially, the present invention provides a container comprising a base, and side walls extending from the base; wherein the base and side walls are thermo/vacuum formed together from a plastics material in such a manner that the base is comparatively rigid and the side walls are thin in comparison to the base and are collapsible but the container is capable of standing unsupported, on the base with the side walls extended and upright.

A container in accordance with the invention may be used as a liner for a receptacle, the liner having a shape which corresponds to the interior of the receptacle. As a modification, the invention also provides, in combination with a receptacle, a disposable liner which fits within and has a shape corresponding to the interior of the receptacle wherein the liner is thermo/vacuum formed from a plastics material. The liner is preferably, but not necessarily, collapsible.

The present invention also provides a spray gun comprising a fluid reservoir; a removable, collapsible, liner which has a shape corresponding to, and is a close fit within, the interior of the reservoir; and a spray nozzle for dispensing fluid from within the liner; wherein the liner collapses when fluid is withdrawn from within the liner during operation of the gun.

Also in accordance with the invention, there is provided a spray gun comprising a fluid reservoir having a removable lid located in an opening in the reservoir; a removable liner located within the reservoir and secured to the reservoir, by the lid, at the periphery of the opening; and a spray nozzle for dispensing fluid from within the liner; wherein the liner is removable from the reservoir together with the lid.

The present invention also provides a gravity-fed spray gun comprising a fluid reservoir having a removable lid located in an opening in the reservoir; and a spray nozzle for dispensing fluid drawn from within the reservoir through an outlet in the lid; wherein the reservoir is removable from the gun and is capable of standing on its own to enable fluid to be loaded into the reservoir through the opening.

The invention further provides a spray gun comprising a fluid reservoir; and a spray nozzle for dispensing fluid from within the reservoir; the reservoir comprising a self-supporting container which is removable from the gun and is collapsible for disposal.

In accordance with another aspect of the invention, there is provided a fluid reservoir for attachment to a spray gun, the reservoir having a removable lid which is located in an opening in the reservoir and in which is formed a fluid outlet for the reservoir; the reservoir including a removable, collapsible, liner which has a shape corresponding to, and is a close fit within, the reservoir; wherein the liner is secured to the reservoir by the lid at the periphery of the opening and is removable from the reservoir together with the lid. The invention also provides a fluid reservoir for attachment to a spray gun, the reservoir having a removable lid which is located in an opening in the reservoir and in which is formed a fluid outlet for the reservoir, the fluid outlet being shaped for attachment to the spray gun; and a closable air vent in the end of the reservoir remote from the lid.

In accordance with yet another aspect of the invention, there is provided a liner for use in the reservoir of a spray gun, the liner being formed from a plastic material and being a close fit within the reservoir; the liner having a comparatively rigid base, and side walls which are thin in comparison to the base and are collapsible.

The present invention also provides a spray gun comprising a fluid reservoir, and a spray nozzle for dispensing fluid from within the reservoir, the reservoir having a removable lid and including a removable, generally conical, mesh filter secured in the reservoir by the lid.

The present invention also provides a gravity-feed spray gun comprising a fluid reservoir, and a spray nozzle for dispersing fluid from within the reservoir, the reservoir having a removable lid and a removable liner secured in the reservoir by the lid.

The term "thermo/vacuum-forming" as used herein means a process by which a sheet of material is heated to a softened condition and formed into a required shape, defined by a mould, while in that softened condition. It includes the case in which the application of a differential air pressure is used to assist in forming the material into the required shape and, in particular, includes the case in which a vacuum is produced on one side of the material to assist in forming it into the required shape (also known simply as "vacuum-forming").

The term "collapsible" as used herein with reference to the side walls of a container/liner in accordance with the invention indicates that the side walls can be distorted so that, by the application of moderate pressure (e.g. hand pressure), the rim of the container can be pushed towards the base of the container, without the side walls being ruptured.

The term "paint" is used herein to include all forms of paint-like coating materials that can be applied to a surface using a spray gun, whether or not they are intended to colour the surface. The term includes, for example, primers, base coats, lacquers and similar materials.

By way of example only, embodiments of the invention will be described with reference to the accompanying drawings, in which.

Figure 23:
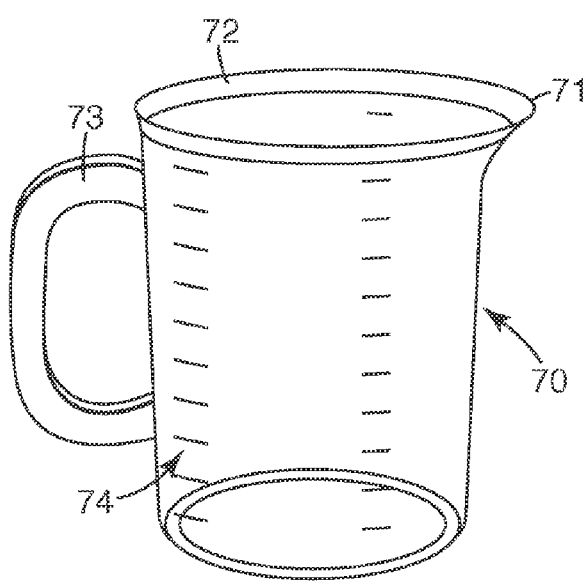
Figure 21A:
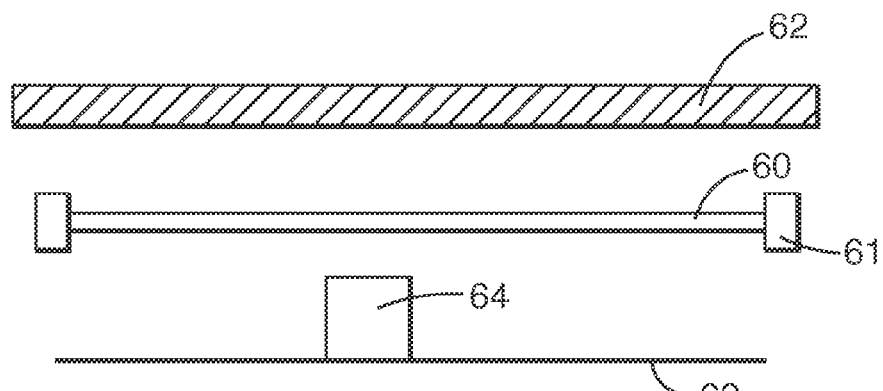
Figure 21B:
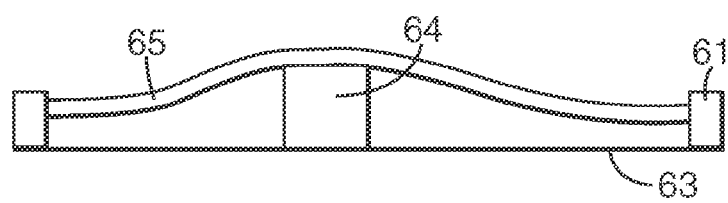
Figure 21C:
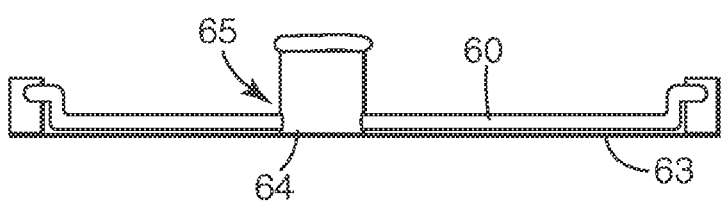
Figure 22:
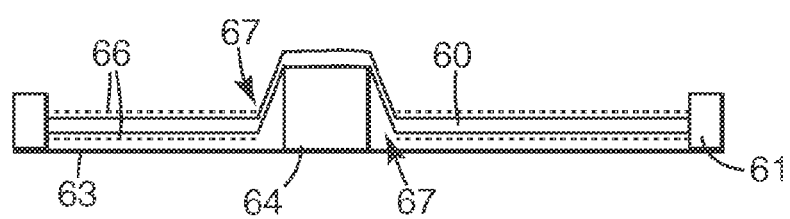

FIG. 21 (*a*) to (*c*) is a diagrammatic illustration of a method for producing a liner for the paint reservoirs of FIGS. 2 to 4, and 10;

FIG. 22 illustrates a modification of the method of FIG. 21;

FIG. 23 shows a paint-mixing pitcher; and

Figure 24:
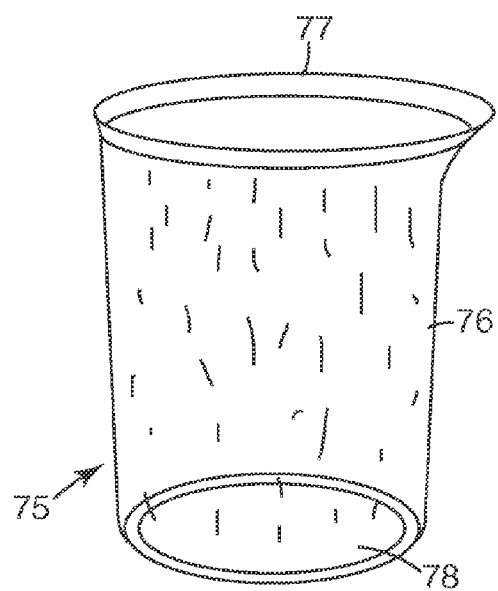

FIG. 24 shows a liner in accordance with the invention, for use with the pitcher of FIG. 23.

Figure 1:
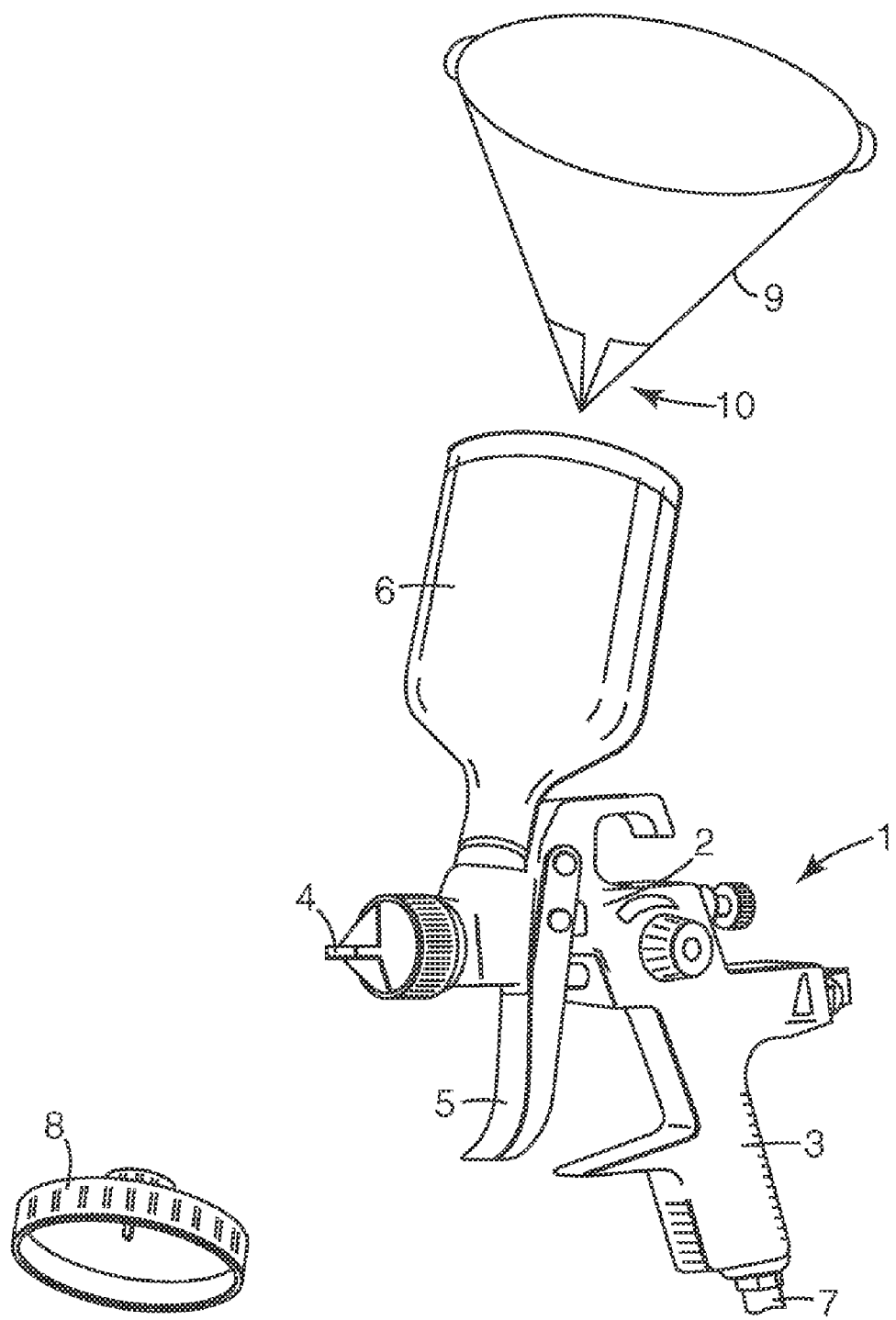
FIG. 1 is a perspective view of a prior art spray gun, shown partly-disassembled so that it can be filled with paint.

FIG. 1 of the drawings illustrates a typical prior art paint spray gun 1 of the gravity-feed type. The gun 1 comprises a body 2, a handle 3 which extends downwards from the rear end of the body, and a spray nozzle 4 at the front end of the body. The gun is manually-operated by a trigger 5 which is pivotally-mounted on the sides of the gun. The paint reservoir, or paint pot, 6 which contains paint (or similar material) to be discharged by the gun, is located on the top of the body 2 and communicates with an internal passageway (not visible) for compressed air, which extends through the gun from a connector 7 at the lower end of the handle 3 to the nozzle 4. In use, the connector 7 is connected to a source of compressed air (not shown) so that, when the user pulls on the trigger 5, compressed air is delivered through the gun to the nozzle 4 and entrains and atomizes paint which is being delivered under gravity from the pot 6. The paint is then discharged through the nozzle 4 with the compressed air, as a spray.

The paint which is contained in the pot 6 is often mixed by hand (for which a separate receptacle, for example a jug, is required), and poured into the pot. To ensure that there are no unwanted particles in the paint, which would spoil the finish of the painted surface, the paint is usually poured into the pot 6 through a filter. FIG. 1 shows the cap 8 of the pot 6 removed for this purpose, and a conical filter 9 about to be positioned on the open end of the pot. The filter 9 is shown as being a known type of disposable conical filter, having solid sides and a filter mesh portion 10 at the pointed end of the cone. When the pot 6 has been filled with paint, the filter 9 is removed and discarded, and the cap 8 of the pot is replaced. If the filter 9 is a reusable filter then, like the gun, it should be cleaned thoroughly before it is used with a different liquid (e.g. a paint of a different colour or a liquid having a different chemical composition).

Figure 2:
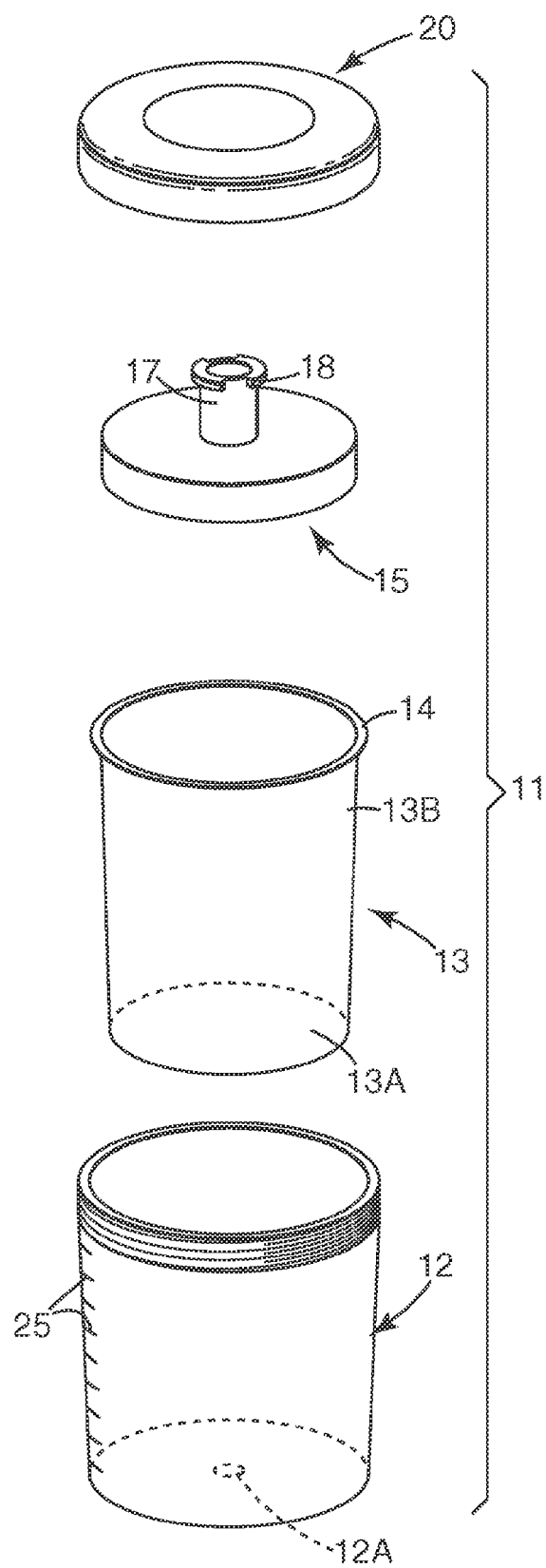
FIG. 2 shows the components of an alternative form of paint reservoir for the gun of FIG. 1, in an exploded condition.

FIG. 2 illustrates the components of an alternative form of paint pot 11 which can be used on the gun 1 of FIG. 1 (or any similar gun) instead of the pot 6. The alternative form of paint pot 11 is shown assembled in FIG. 3 and (in cross-section) in FIG. 4.

The paint pot 11 comprises an open container 12, comparable in size to a conventional paint pot of a hand-held spray gun, having an air hole 12A in its base and provided with a disposable liner 13. The liner 13 corresponds in shape to (and is a close fit in) the interior of the container 12 and has a narrow rim 14 at the open end which sits on the top edge of the container. The container 12 also has a disposable lid 15 which is a push-fit in the open end of the liner 13. The lid 15 has a central aperture 16 (FIG. 4) from which extends a connector tube 17 provided, at its end, with outward extensions 18 forming one part of a bayonet connection. The aperture 16 is covered by a filter mesh 19 which may be a push fit into the aperture or may be an integral part of the lid 15. The lid 15 is held firmly in place on the container 12 by an annular collar 20 which screws onto the container, on top of the lid.

Figure 3:
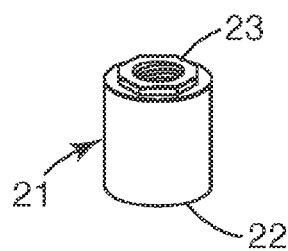
FIG. 3 shows the paint reservoir of FIG. 2 in an assembled condition, with an adapter for connecting the reservoir to a spray gun.
Figure 3:
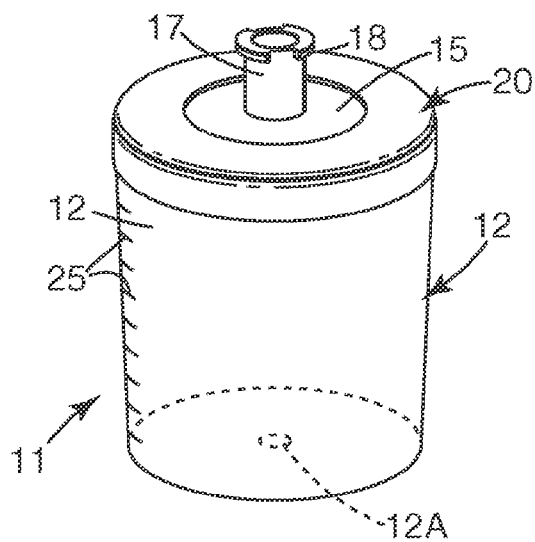
Figure 4:
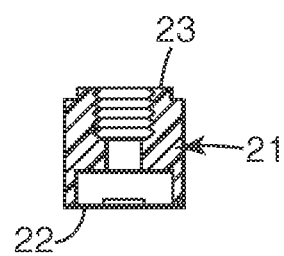
FIG. 4 shows a longitudinal cross-section through the paint reservoir and the adapter of FIG. 3.
Figure 4:
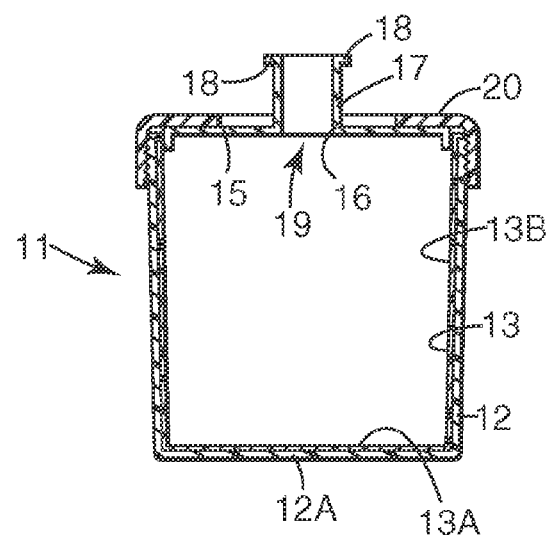

The paint pot 11 is attached to the spray gun 1 through the use of an adapter 21 shown, separated from the paint pot, in FIG. 3 and (in cross-section) in FIG. 4. The adapter 21 is a tubular component which, at one end 22, is formed internally with the other part of the bayonet connection for attachment to the connector tube 17 of the paint pot 11. At the other end 23, the adapter is shaped to match the standard attachment of the spray gun paint pot (typically a screw thread).

The liner 13 of the paint pot 11, as already mentioned, corresponds in shape to the interior of the container 12 and has a narrow rim 14 at the open end which sits on the top edge of the container. As described below, the liner is self-supporting but is also collapsible and, preferably, has a comparatively rigid base 13A and comparatively thin side walls 13B so that, when it collapses, it is in the longitudinal direction by virtue of the side walls collapsing rather than the base. In addition, the liner 13 has no pleats, corrugations, seams, joints or gussets, and also no groove at the internal junction of the side walls 13B with the base 13A. A liner of that type will be described in greater detail later with reference to FIGS. 19 and 20. Also described below is a thermo-forming process by which such a liner can be produced.

The container 12 of the paint pot 11 is formed from a plastic material, for example polyethylene or polypropylene, and may be translucent (as shown in FIG. 2) or opaque, and of any suitable size. For use with a paint spray gun, containers having a capacity of 250, 500 or 800 ml could typically be used, although other sizes could be used if required. The lid 15 is also formed from a plastic material, for example polyethylene or polypropylene, and may be formed by an injection moulding process. The lid may be translucent or opaque and may be coloured. The collar 20 may be a moulded plastic component, or it may be a machined metal (for example, aluminum) component. The adapter 21 may be a machined metal component and may, for example, be formed from aluminum and anodised.

Figure 5:
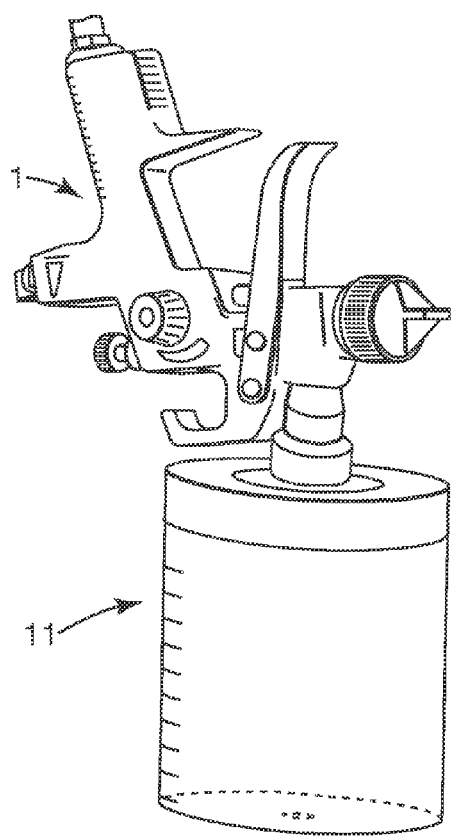
FIG. 5 shows the paint reservoir of FIG. 4 being attached to a spray gun.
Figure 6:
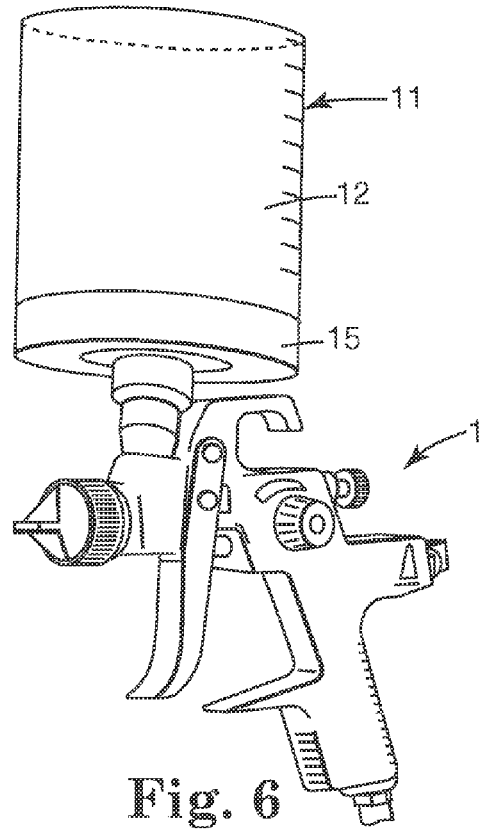
FIG. 6 shows the paint reservoir of FIG. 4 in use on a spray gun.

To use the paint pot 11, the adapter 21 is attached (at the end 23) to the spray gun and is left in position. Then, with the paint pot 11 disassembled as shown in FIG. 2, the liner 13 is pushed inside the container 12. Paint is then put into the container, the lid 15 is pushed into place and the collar 20 is screwed down tightly to hold the lid in position. The top portion of the liner 13 is then trapped between the lid 15 and the container 12, and the liner rim 14 is trapped between the top edge of the container and the collar 20, as shown in FIG. 4. Advantageously, the lid 15 is formed with barbs (not visible) on its surface to engage and hold the top of the liner. The spray gun 1 is then inverted from its normal operating position so that the end of the connector tube 17 can be attached to the adapter 21 as illustrated in FIG. 5, after which the gun can be returned to its normal position (illustrated in FIG. 6) and is ready for use in the usual way. As paint is removed from within the liner 13, the sides of the liner collapse as a result of the decreased pressure within the liner. The base of the liner, being more rigid, retains its shape so that the liner tends to collapse in the longitudinal rather than the transverse direction thereby reducing the possibility of pockets of paint being trapped in the liner.

The user can choose to evacuate the air from within the liner 13 before operating the spray gun 1 although that is not essential. It does, however, increase the range of angles at which the gun will function satisfactorily since there is no risk of air entering the gun from the paint pot 11. To evacuate the air from within the liner 13, the trigger 5 of the gun should be actuated while the gun is still in the position shown in FIG. 5.

Figure 7:
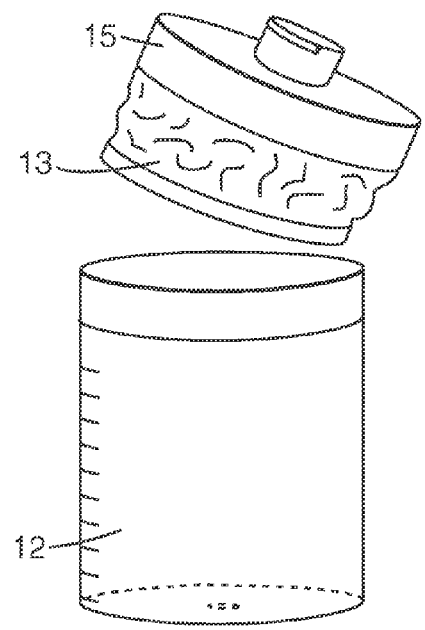
FIG. 7 shows components of the paint reservoir of FIG. 4 being removed after use.

After use, when the gun is to be cleaned, the gun can be re-inverted and the trigger 5 can be actuated briefly to allow paint within the gun to drain back into the liner in the pot 11. The pot 11 is then removed from the gun by detaching the connector tube 17 from the adapter 21 (which remains on the gun). The collar 20 is removed from the container 12, and the lid 15 is then pulled out, bringing with it the collapsed liner 13, as shown in FIG. 7. The lid (including the filter 19) and liner are discarded, leaving the container 12 and collar 20 clean and ready for re-use with a fresh liner and lid. Only the gun itself needs to be cleaned, resulting in a substantial reduction in the amount of solvent used. The risk of unused paint spilling from the pot 11 is also substantially reduced because the liner 13 is removed and discarded with the lid 15 in place. Moreover, because the liner is discarded in a collapsed condition, the amount of space required for collection of used liners is minimized.

Because the liner 13, as described above, is an accurate fit inside the container 12 and has a smooth internal surface, it is possible to mix paint in the container 12 itself rather than in a separate receptacle. In that way, cleaning of a separate mixing receptacle can be eliminated to achieve a further reduction in the amount of solvent used. That possibility does not exist when using a gravity-feed gun with a conventional paint pot, as shown at 6 in FIG. 1, because the latter is open at both ends. The possibility of the liner 13 being punctured or damaged by the mixing implement is minimized, first because the liner fits inside the container 12 exactly and, second, because the self-supporting nature of the liner (described below) means that it is less likely to be dragged around inside the container during the mixing process. To facilitate the use of the container 12 as a mixing receptacle, the side walls of the container may be provided with markings 25 (FIGS. 2 and 3) enabling the volume of the contents of the container to be determined. The general shape of the container 12 and, in particular, the fact that it is flat-bottomed and stable when in the orientation shown in FIG. 2 makes it particularly suitable for use as a mixing receptacle, as does the fact that it is translucent as already described. If, however, the container 12 is opaque, it could be formed with slots in the side walls, through which the liner 13 could be viewed to enable the user of the spray gun to assess the amount of paint in the pot 11 at any time.

When paint is mixed in the container 12, the inclusion of the filter mesh 19 in the container lid 15 prevents unwanted particles in the paint from entering the spray gun. The mesh 19 can be omitted, however, if the paint is textured, or if it is mixed in a separate receptacle and strained when it is transferred to the lined container 12 or if the presence of contaminants in the paint is unimportant.

Figure 8:
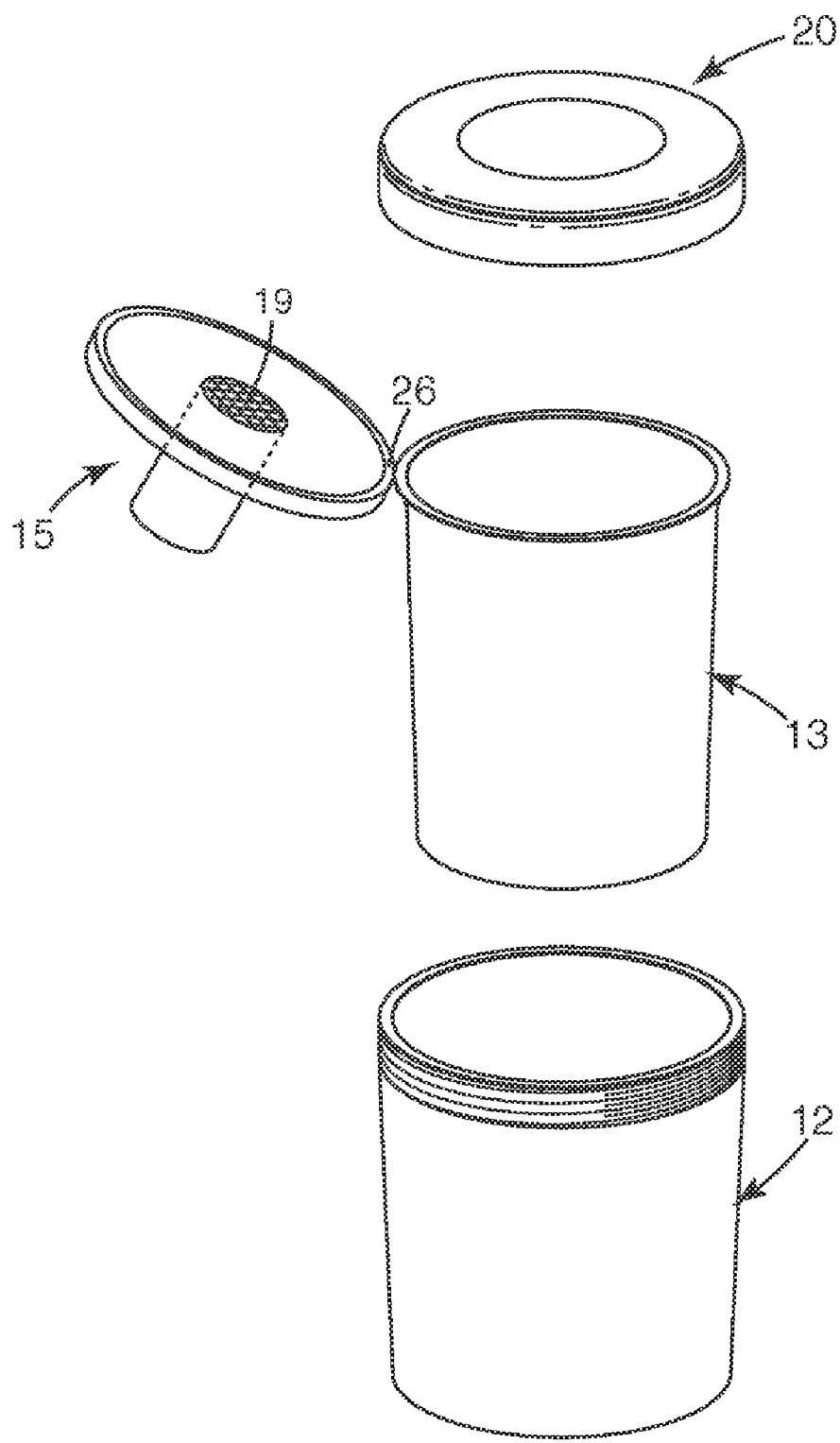
FIG. 8 is similar to FIG. 2 but shows a modified form of paint reservoir.

Although the collar 20 of the paint pot 11 is described above as being a separate item, it could be combined with the lid 15, in which case it would also be disposable. As a further alternative, the lid 15 (with the connector tube 17 and the mesh 19) could be formed as an integral part of the liner 13, to which it could be connected by a hinge joint 26 as illustrated in FIG. 8. In that case, there is no need for the lid to fit inside the mouth of the liner to ensure that the lid and liner will be removed together from the container after use: however, that would still be necessary if the lid were required to remain in place in the liner after use. As yet another alternative, the collar 20 could be replaced by a band secured around the top of the pot 11 to hold the lid 15 and liner 13 in place. The band could be secured to the pot 11 and could, for example, be formed from rubber or be part of a metal clip arrangement of the type used to secure the tops of jars and bottles.

If a more positive engagement is required between the lid 15 of FIGS. 2 to 4 and the liner 13, the lid could be a snap fit with the liner instead of a push-fit as shown. The liner could, for example, be formed with an internal circumferential rib positioned to engage in a corresponding groove on the adjacent surface of the lid.

Figure 9:
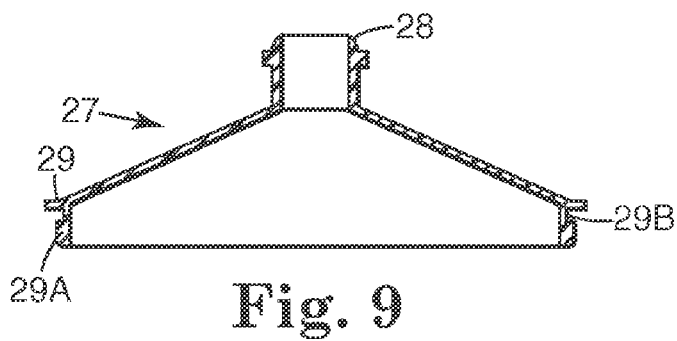
FIG. 9 shows a longitudinal cross-section through an alternative form of lid for the paint reservoirs of FIGS. 2 to 4 and 8.

As yet a further alternative, the push-in lid 15 could be replaced by a lid 27 having the form shown in FIG. 9. The lid 27 is also a push-fit inside the liner but is generally conical in shape and at its upper end 28, corresponds in shape to the end of the connector tube 17 of FIGS. 2 to 4 so that it will engage in the same adapter 21. The lid 27 has an outwardly-extending rim 29 which will sit on top of the liner rim 14, and a shaped portion 29A which will engage the internal surface of the liner. The form of the shaped portion 29A allows the lid 27 to be pushed into the mouth of the liner and also provides a recess 29B into which the edge of the liner can contract so that the lid is securely located. The form of the shaped portion illustrated in FIG. 9 is not essential, however, and alternatives could be used including, for example, barbs as described above with reference to the lid 15 of FIG. 4. The lid 27 is held in place on the container by a screw-on collar, similar to the collar 20, which will sit on top of the rim 29 of the lid. The lid 27 may incorporate a filter similar to the filter 19 of FIGS. 2 to 5. Alternatively, in each case, the filter may be generally cylindrical in shape so that it can be inserted into the tubular part of the lid from the end adjacent the bayonet connection. In that case, the internal shaping of the tubular part of the lid should ensure that the filter remains in position when the spray gun is in use.

Figure 10:
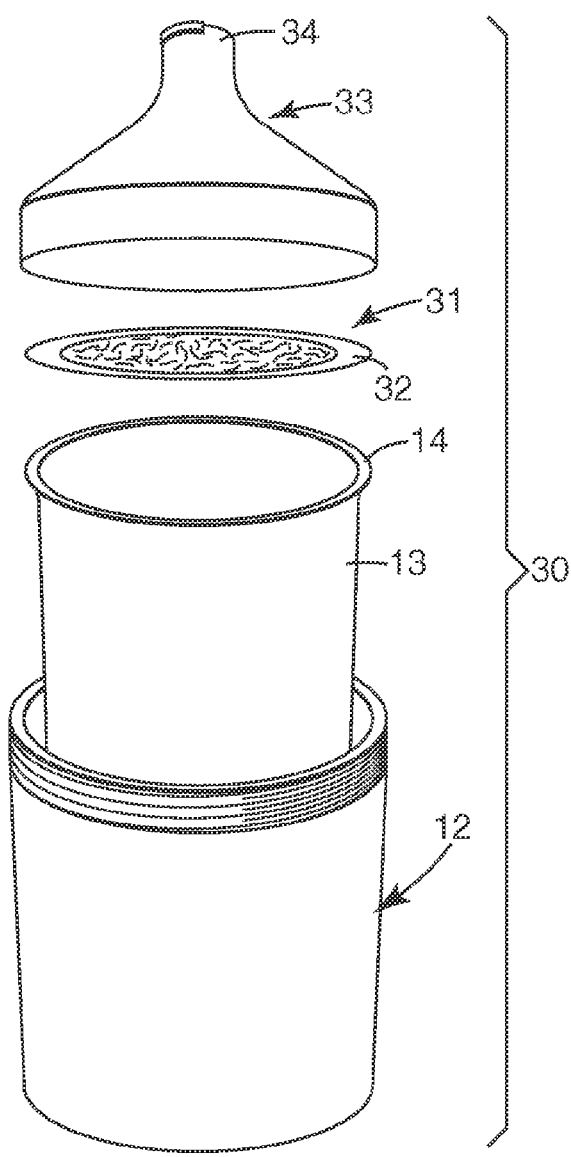
FIG. 10 is similar to FIG. 2 but shows another modified form of paint reservoir.
Figure 11:
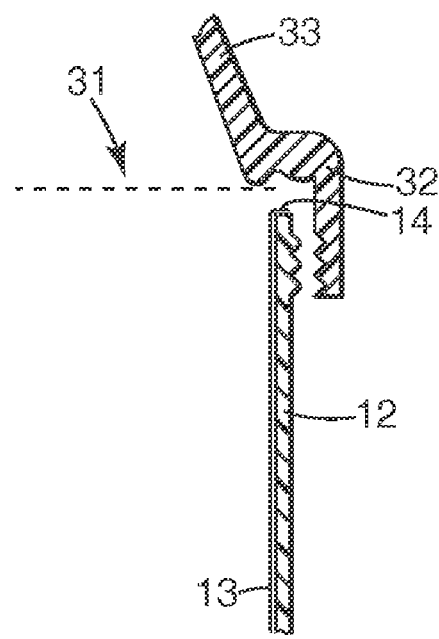
FIG. 11 shows part of a longitudinal cross-section through the paint reservoir of FIG. 10.

The components of an alternative form of paint pot 30 are illustrated in FIG. 10. The pot 30, like the pot 11 of FIG. 2, comprises a container 12 and a liner 13. In this case, however, the filter 19 of the pot 11 is formed as a separate item 31 having a diameter corresponding to that of the container 12 and including a circumferential sealing gasket 32. In addition, the lid 15 and collar 20 of the pot of FIG. 2 are replaced by a generally-conical lid 33 which is a screw-fit onto the container and which, at its upper end has a tubular extension 34 of similar shape to the connector tube 17 of FIG. 3 so that it will engage in the same adapter 21. The pot 30 is assembled by pushing the liner 13 inside the container 12 and then, after paint has been put into the container, placing the filter 31 on top of the container and securing it in position by screwing down the lid 33. The rim 14 of the liner 13 and the sealing gasket 32 of the filter 31 are then both trapped between the lid 33 and the container 12, as illustrated in FIG. 11, thereby preventing the leakage of paint from the pot 30 at this location when the pot has been secured to a spray gun and is inverted for use.

The adapter 21 could be dispensed with by forming the ends of the tubular parts 17, 34 of lids of the containers 11, 30 with screw threads so that they can engage directly in the standard paint pot attachment on the spray gun 1.

Figure 12:
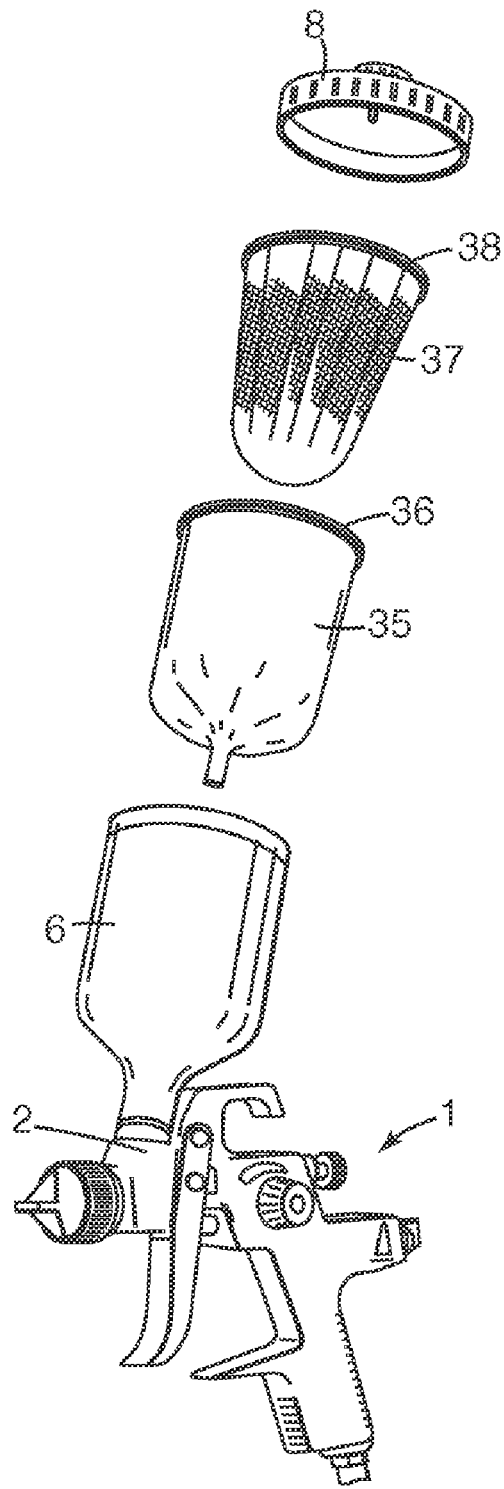
FIG. 12 shows a spray gun similar to that of FIG. 1 but with an alternative form of paint reservoir.

FIG. 12 illustrates an alternative spray gun in which the standard paint pot 6 of the spray gun 1 (see FIG. 1) is retained and is provided with a liner 35 which fits inside the pot and, preferably, extends into the connection with the body 2 of the gun to form a liquid-tight seal with the latter, for example through the use of a flexible O-ring (not visible) between the gun and the liner. In this case, the liner 35 does not collapse when paint is removed from within the pot and may be formed from a more rigid material to assist in positioning it within the pot 6. Once in position, the liner 35 is held in place by the cap 8 which is screwed down onto an outwardly-extending rim 36 at the open end of the liner. The pot 6 of FIG. 12 is additionally provided with a filter 37 which is of generally conical shape and formed entirely of mesh material and which, in use, is positioned inside the liner 35. The filter 37, like the liner 35, has an outwardly-extending rim 38 which lies on top of the liner rim 36 and is likewise held in place by the cap 8 of the pot 6.

The pot 6 of FIG. 12, unlike the pot 11 of FIG. 3 is intended to be filled with paint while attached to the spray gun 1. The liner 35 and filter 37 are placed in position, paint is poured into the pot, and the cap is fitted. During this operation, there is no risk of the filter being dislodged and, because the filter is formed entirely of mesh material, the user is always able to see the paint level while the paint is being poured into the pot. The gun 1 is then ready for use. All of the paint dispensed by the gun passes through the filter 37 and there is, accordingly, no need for the paint to be filtered when it is being poured into the pot 6. After use, the cap 8 unscrewed is to allow the filter 37 and liner 35 to be removed. The liner 35 is discarded and the filter 37 is either also discarded or is cleaned, depending on whether or not it is disposable. The use of the liner 35 again reduces the amount of solvent required to clean the gun 1, with a further reduction being possible through the use of a disposable filter 37.

The filter 37 can have any suitable shape and may, for example, have fluted sides to increase the effective surface area of the filter.

Figures 13, 14:
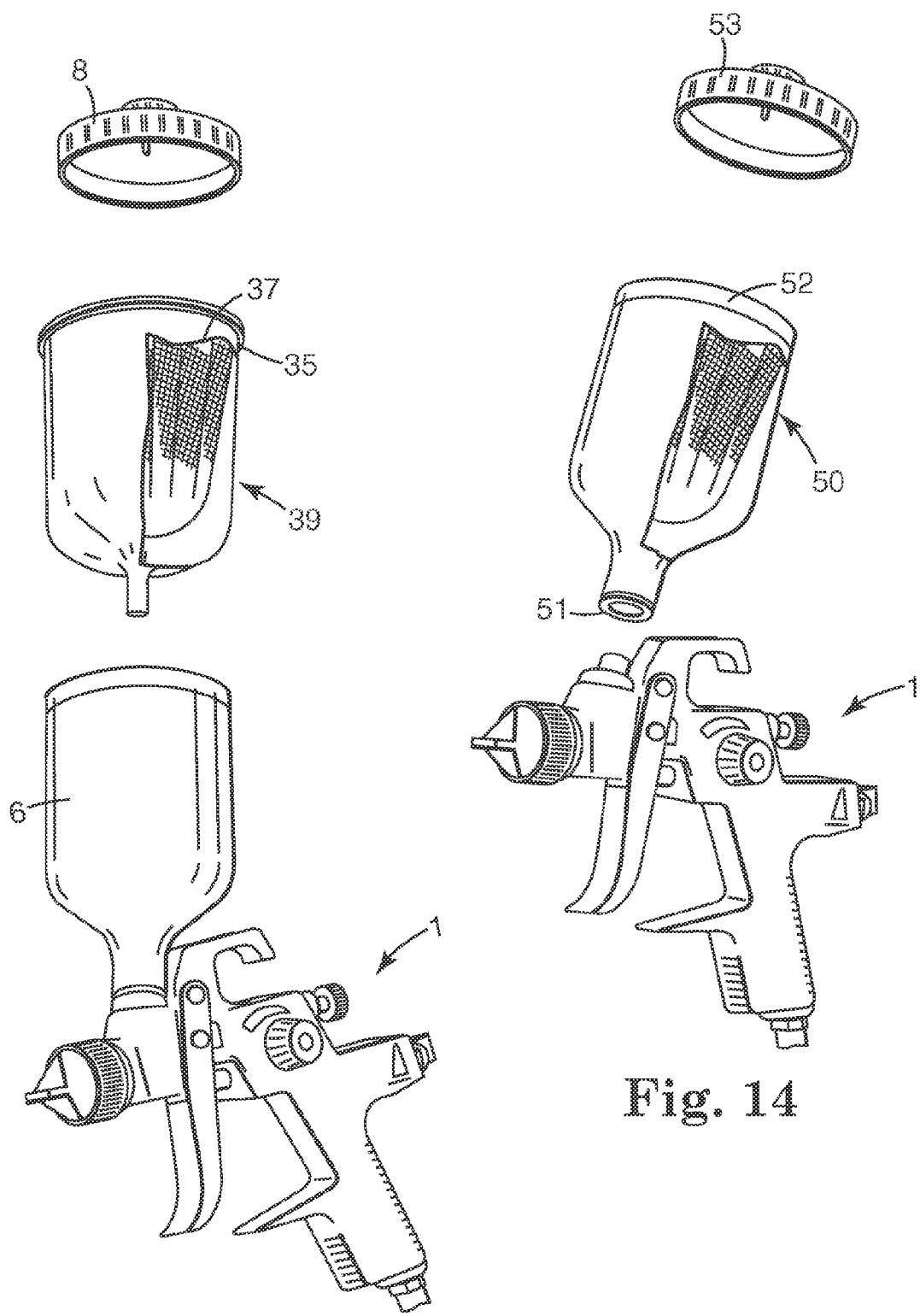
FIG. 13 shows the gun of FIG. 12 with a modified form of paint reservoir.
FIG. 14 illustrates a modification to the reservoir of the gun of FIG. 13.

In a modified arrangement, illustrated in FIG. 13, the liner 35 and the filter 37 are combined to form a single unit 39. In this case, the filter is discarded with the liner.

In each of the arrangements shown in FIGS. 12 and 13, the liner 35 and filter 37 can be removed from the pot 6 with the lid 8. In that case, it is possible to replace the conventional lid 8 of the pot 6 by a disposable lid so that the lid 8, liner 35 and filter 37 can be discarded together.

The disposable unit 39 of FIG. 13 could be modified so that it would replace the paint pot 6 of the spray gun 1 instead of being fitted inside the paint pot. In that case, the unit 39 could be supplied as a sealed cartridge 50 already filled with paint as illustrated in FIG. 14. Externally, the cartridge 50 is similar to the paint pot 6 and can be connected to the gun 1 in the same way. Because it is sealed, however, the outlet end 51 of the cartridge must be pierced and an air vent provided, for example at the other end 52 of the cartridge, to allow paint to flow into the gun. The outlet end 51 of the cartridge 50 could, for example, be pierced by the user before the cartridge (with the outlet end uppermost) is attached to the (inverted) gun. Alternatively, the gun 1 could be modified so that the outlet end 51 is pierced automatically when the cartridge 50 is attached to the gun. An air vent at the other end 52 of the cartridge 50 could then be formed after the cartridge has been attached to the gun by piercing that end of the cartridge either manually or, for example, by attaching a separate cap 53 which is designed to pierce the cartridge when it is placed in position. Alternatively, an air vent, which simply needs to be opened when the gun is ready for use, could be pre-formed in the cartridge.

After use, the cartridge 50 is removed from the gun and discarded. Because the cartridge 50 contains a filter, there is no need for the supplier to filter the paint before it is loaded into the cartridge. If, however, the paint is pre-filtered, then the filter in the cartridge 50 can be omitted.

Figure 15:
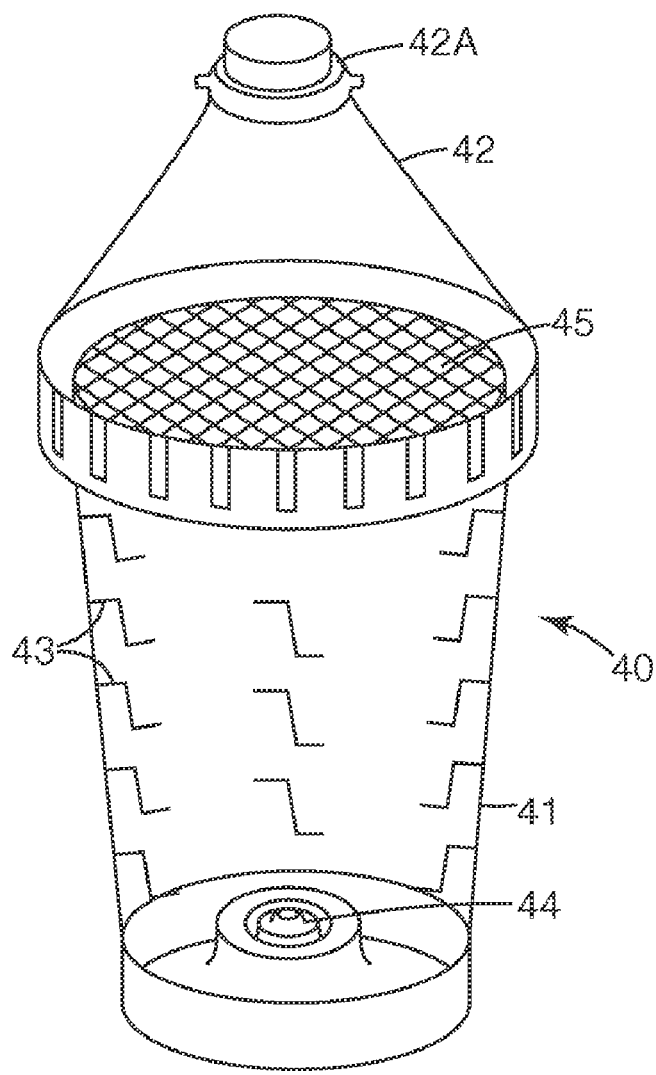
FIG. 15 is a view, similar to FIG. 3, of an alternative form of paint reservoir.

FIG. 15 illustrates an alternative form of paint pot 40 for a spray gun 1, which is entirely disposable. The paint pot 40 is generally similar to the pot 30 shown in FIG. 10 except that the container 12 is replaced by a disposable container 41, described below, and the liner 13 is omitted.

The container 41 of FIG. 15 can be any conventional disposable container suitable for containing paint and for attachment to the paint pot lid 42. The container 41 may, for example, be formed from a thin plastic material, preferably translucent (as shown) so that the contents of the container are visible and preferably having markings 43 on the side walls to enable the volume of the contents of the container to be determined. An air hole 44 is formed in the base of the container, together with some means for closing the air hole when desired. That means may take the form of a strip of adhesive tape (not shown) which is peeled back to open the hole 44 and can be re-adhered to close the hole when required. Alternatively, a flip-top closure or some simple hand-operated valve mechanism may be provided. The container 41 has an external screw-thread at its open end, for attachment of the lid 42 which is generally similar to the lid 33 of FIG. 10 and is likewise shaped, at its upper end 42A, for attachment to a spray gun (if necessary by means of a suitable adapter). The lid 42 may be formed from the same material as the container 41 and, as shown, may also be translucent. A flat filter mesh 45, which is also disposable, extends across the mouth of the container 41. The mesh 45 may be a separate item, held at its periphery between the lid 42 and the container 41, or it may be formed integrally with the lid.

To use the pot 40, the lid 42 and filter mesh 45 are removed from the container 41 which is then filled with paint (care being taken that the air hole 44 in the base of the container is closed). It is unnecessary to strain the paint when it is put into the container 41 and, as described above, it is possible to mix the paint in the container thereby avoiding the need for a separate receptacle for that purpose. The lid 42 and mesh 45 are then put back in position on the container 41, the lid 42 is attached to the (inverted) spray gun 1 which is then returned to its normal position, and the air hole 44 in the base of the container is opened. The spray gun 1 can now be used in the usual way. On completion of the spraying operation, the air hole 44 is closed-off again, the pot 40 is detached from the gun 1 and may then be discarded leaving only the gun to be cleaned. Before the pot 40 is detached, the spray gun 1 can be re-inverted and the trigger 5 of the gun operated to allow excess paint remaining in the gun to drain back into the pot. In either case, if sufficient paint remains in the pot 40, the pot could be re-sealed (instead of being discarded) and used again.

Advantageously, the container 41 of the pot is formed so that it can be collapsed after use. In some cases, it may be possible for the lid 42 also to be collapsible.

As an alternative, the lid 42 could be a reusable component and would be cleaned with the gun. With an arrangement of that type, it is possible for the disposable container 41 to be supplied as a cartridge already filled with paint and sealed by a cover which would simply be removed before the container is attached to the lid 42. The filter mesh 45 could be either a disposable or a reusable component. As a further alternative, the container 41 and lid 42 together could be supplied as a cartridge sealed by a removable cover, at the upper end 42A of the lid, which would be removed before the cartridge is attached to the gun. In that form, the cartridge is similar to the cartridge 50 of FIG. 14.

Figure 16:
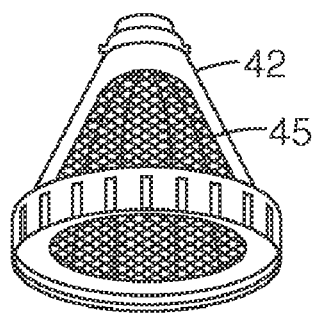
FIGS. 16 and 17 show modified forms of a component of FIG. 15.
Figure 17:
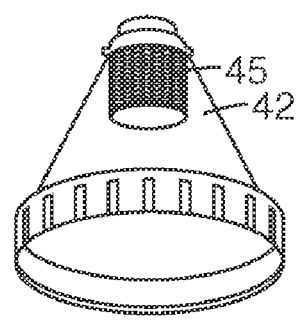

Through an appropriate selection of the dimensions of the lid 42 of the paint pot 40, it is possible for the one lid 42 to be used with containers 41 of different sizes. The user would then select, in each case, the container 41 that contains the most suitable amount of paint. It may also be desirable for a range of filters 45 having different mesh sizes to be provided so that the user can select the mesh size that is best suited to the type of paint that is being used. It is not essential for the filter mesh 45 to have the form and/or location shown in FIG. 15: it could, for example, have a conical form as shown in FIG. 16 and/or it could be located in the outlet of the lid 42, as shown in FIG. 17. Alternatively, the filter 45 can be omitted if the paint is filtered before it is put into the container 41, or if the presence of contaminants in the paint is unimportant.

The lid 42 need not have the exact shape shown in FIG. 15 and could, for example, be replaced by a push-in lid in combination with a screw-on collar as shown in FIG. 2.

When the container 41 (with or without the lid 42) is supplied as a cartridge containing paint (or other coating material) it may be desirable in some cases for the paint/coating material to be contained within a sealed collapsible liner within the cartridge. That may, for example, be desirable if it is necessary for the paint/coating material to be kept isolated, for example from the air or from light, until it has been sprayed onto the surface to be coated. The air hole 44 in the container 41 can then remain open all the time, or may be omitted if the container 41 itself is not airtight.

Figure 18:
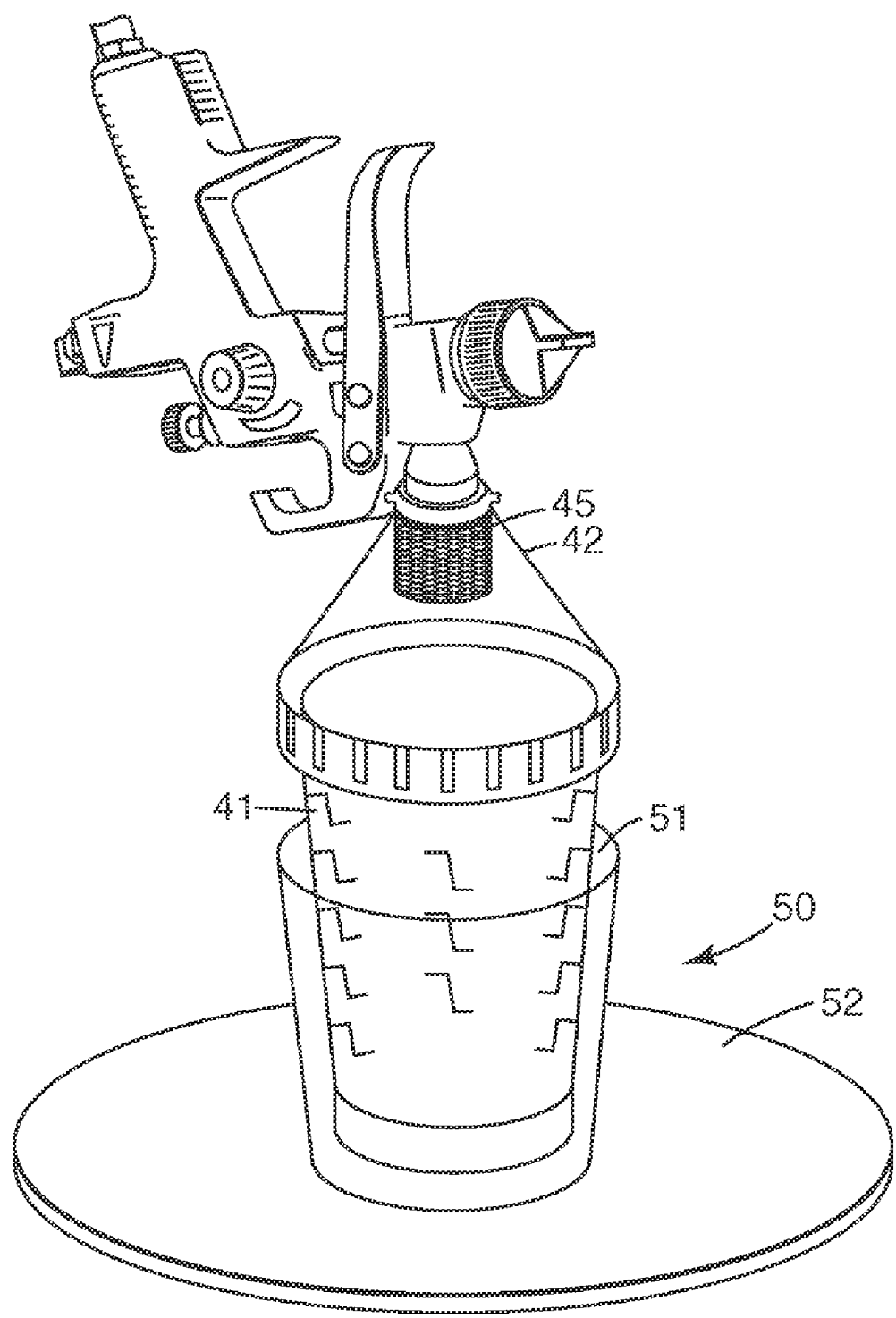
FIG. 18 illustrates the use of a holder for the paint reservoir of FIG. 15.

Depending on the shape of the container 41, it may be desirable to provide a holder in which the container can be located to ensure that it will not be knocked over. One suitable holder 50, shown in FIG. 18, comprises container portion 51 which is of similar shape to, but slightly larger than, the container 41 and is provided with an enlarged base 52. The container 41 is placed in the container portion 51 to ensure that it remains upright while it is being filled and/or attached to the spray gun 1.

Although the above description refers to a paint spray gun, it should be understood that it applies also to other types of spray gun including, for example, guns of the type which are attached to water hoses (rather than air supply lines) for spraying substances such as garden chemicals. The description also applies to suction-feed guns, i.e. guns in which the liquid outlet from the reservoir is located at the top of the reservoir when the gun is in use and liquid is drawn from the reservoir through a supply tube by the action of the compressed air or other pressurized fluid flowing through the gun. In that case, when a liner is provided for the reservoir, the construction of the liner and/or the supply tube should be such that the liner can collapse without blocking the supply tube. For example, a short supply tube can be used provided all air is exhausted from the liner before the gun is used. Alternatively, a flexible supply tube could be used, which will collapse with the liner. As a further alternative, a modified liner which does not have a rigid base could be used, so that the liner collapses in a different manner from the liner 13 of FIG. 2. Since the reservoir of a suction-feed gun is not inverted during use, as in a gravity-feed gun, it is possible to omit the air hole in the reservoir, provided the connection between the reservoir and the gun permits air to enter the space between the reservoir and the liner.

Figure 19:
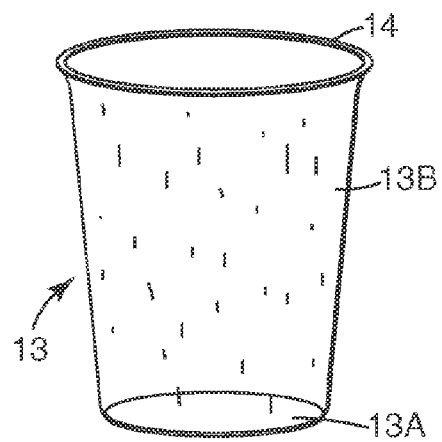
FIG. 19 is a perspective view of a liner/container in accordance with the invention.
Figure 20:
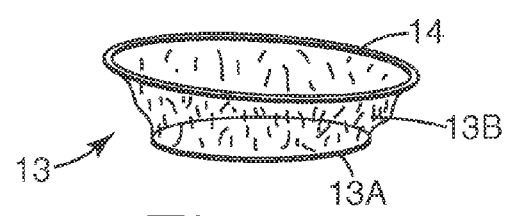
FIG. 20 is a similar view but showing the liner/container in the process of being collapsed for disposal.

Returning now to the paint pot 11 of FIG. 2, the liner 13 will now be described in greater detail, together with a method by which it can be produced. The liner, shown in isolation in FIGS. 19 and 20, is preferably transparent and is thermoformed from a single piece of plastics material, preferably polyethylene or polypropylene. The shape of the liner is dictated by the internal shape of the container 12. The comparatively rigid base 13A is circular and the liner 13, like the inside of the container 12, is generally cylindrical but tapers inwards slightly from the mouth towards the base 13A. The rim portion 14, like the base, is also comparatively rigid but the side walls 13B are flexible and, as already described, can be made to collapse. Nevertheless, the liner 13 is capable of standing, unsupported, on the base 13A with the side walls 13B extended and upright as shown in FIG. 19. When the liner 13 collapses, the comparatively rigid base 13A retains its form but moves towards the rim portion 14 of the liner as a consequence of the collapse of the side walls 13B, as illustrated in FIG. 20. The side walls 13B collapse in a similar fashion to a plastic bag without being ruptured (e.g. by splitting, tearing or cracking).

In one form, the liner has a height of about 110 mm, a diameter at its base 13A of about 78 mm and a diameter at its mouth (excluding the rim portion 14) of about 86 mm. The base has a thickness of about 400 μm, the rim portion 14 has a thickness of about 900 μm, and the side walls 13B have a thickness of about 150 μm. In another form, the liner has the same height and the same diameters at its base and mouth but the base has a thickness of about 300 μm, the rim portion has a thickness of about 200 μm, and the side walls 13B have a thickness in the range of from 50 to 250 μm.

A method of producing a liner as shown in FIG. 19 will now be described with reference to FIG. 21 (*a*)-(*c*).

A sheet 60 of low density polyethylene (LDPE), approximately 250×225 mm and 0.5 mm thick, was clamped at its periphery in the moulding frame 61 of a vacuum-forming machine. The LDPE material is commercially available from, for example, Plastech Extrusions Ltd. of Widnes, Cheshire, England and the vacuum-forming machine used was the model "FLB 725" from C.R. Clarke and Company Limited of Ammanford, Carmarthenshire, Wales. It will be appreciated, however, that any suitable plastics material could be used and that the method could be carried out using any suitable thermo/vacuum-forming machine.

After the sheet 60 had been placed in position, the bank of heaters 62 of the vacuum-forming machine was moved into position above the sheet (as shown in FIG. 21(*a*)), and the sheet was heated to a soft, pliable, state suitable for vacuum-forming. The fact that the sheet had reached the appropriate temperature could be seen by the change in its appearance from milky to transparent.

The bank of heaters 62 was then removed and the mould platen 63 was moved upwards from below the sheet 60, bringing the mould 64 into contact with the sheet to deform the latter in an upwards direction. At this time, the vacuum pump of the machine was switched on to remove air from beneath the sheet 60. The upward movement of the mould platen 63 was continued until the platen reached the top of its stroke, where it seals against the frame 61 holding the sheet 60 (FIG. 21(*b*)). The mould 64 had a shape corresponding to the internal shape of the container 12 of the spray gun paint pot 11.

Operation of the vacuum pump was continued with the mould platen sealed against the frame 61 and the pressure difference created between the upper and lower sides of the sheet 60 caused the latter (which was already in contact with the top of the mould 64) to move down into contact with the sides of the mould (FIG. 21(*c*)). The mould platen 63 was then moved away from the cooled sheet 60 leaving a moulded portion 65 having the desired shape of the liner 13 and without any pleats, corrugations, seams, joints or gussets, or any groove at the internal junction of the side walls 13B with the base 13A. Following removal from the frame 61, the sheet 60 was trimmed around the mouth of the moulded portion 65 to form the rim 14 of the liner 13. The width of the rim 14 is determined by the location at which the sheet 60 is trimmed at this stage, and can be adjusted as required.

The above-described process was found to yield a moulded portion 65 (and hence a liner 13) in which that part of the plastics sheet 60 that had been in contact with the sides of the mould 64 during the forming process was substantially thinner than the part that had been in contact with the top of the mould. The process differs from a conventional vacuum-forming process which would aim to eliminate, as far as possible, any differences in thickness in the moulded portion 65 and, to that end, would include the additional step of applying air pressure to the underneath of the heated sheet 60, after step (a) of FIG. 21, to cause the sheet to adopt a dome shape before the mould platen 63 seals against the frame 61: the thickness of the sheet would then be comparatively even when it moves into contact with the mould 64 in step (c) of FIG. 21. Generally in the process illustrated in FIG. 21, for a given size of sheet 60, the size of the mould 64 has been found to affect the thickness of the sides of the resulting liner 13 more than the base. In other words, if the size of the mould 64 is increased, the thickness of the base of the resulting liner 13 will be about the same but the sides of the liner will be much thinner. On the other hand, if the size of the mould is decreased, it may be found that a point is reached at which longitudinal creases appear in the sides of the liner 13.

If a further reduction is required in the thickness of the sheet 60 where it contacts the sides of the mould 64 in step (c) of FIG. 21, the sheet 60 can be located between two thin metal plates 66 (FIG. 22) when it is clamped in the frame 61 of the forming machine, each metal plate 66 having a hole 67 in the location of the mould 64 and larger in size than the largest cross-section of the mould. The plates 66 are also clamped in the frame 61 and the process of FIG. 21 is then repeated. The effect of the plates 66 is that only the central portion of the sheet 60 is exposed directly to the heaters 62 and is drawn over the mould 64 when the latter has been moved upwards (in this case, through the holes 67 in the plates 66). In that way, less of the sheet 60 is used in the formation of the moulded portion 65 and the resulting liner 13 will have a slightly thinner base 13A and rim 14 and substantially thinner side walls 13B. It is also possible to obtain a comparable result by using only the upper plate 66 shown in FIG. 22.

As a modification of the process illustrated in FIG. 22, the plastics sheet 60 can be in the form of a circular disc of material which is clamped at its periphery between the two plates 66. Depending on the size of the disc, the clamped periphery may then form the rim 14 of the liner 13 and there may be no excess material to be trimmed away.

It has been found that a liner 13 produced by a process as described with reference to FIGS. 21 and 22 will collapse as described with reference to FIG. 20 when used in the spray gun reservoir 11 of FIG. 2. The liner 13 can also be collapsed by hand by pushing the base 13A of the liner towards the rim 14. It has been found that the liner is typically capable of standing unsupported on its base 13A and this feature, although not essential to the use of the liner in the spray gun reservoir 11, may be of use for storage purposes. The liner has no pleats, corrugations, seams, joints or gussets, and no groove at the internal junction of the side walls 13B with the base 13A: consequently, there are no internal locations in which material within the liner can become trapped. The base 13A of the liner will, of course, occupy some space at the base of the container 12 of the spray gun reservoir 11 and the markings on the wall of the container 12 need to be positioned to take account of that fact.

Although the liner 13 of FIG. 19 has been described for use specifically in the paint pot 11 of FIG. 2, the same or a similar article can be used in other ways (subject, if necessary to appropriate dimensional changes). For example, an article of the type illustrated in FIG. 19 can also be used as a liner in many forms of receptacle other than a spray gun reservoir. It is often desirable to provide a receptacle with a disposable liner, for example to keep the receptacle clean, to facilitate cleaning, or to protect the receptacle or its contents. A liner of the type illustrated in FIG. 19 can be used for any of those purposes and is especially useful in receptacles in which substances are mixed together because there are no locations on the inside of the liner in which material can become trapped and remain unmixed.

An article of the type illustrated in FIG. 19 can, for example, be used as a liner in a receptacle intended for paint mixing in a vehicle body shop, in which case it will provide an attractive alternative to the disposable drinking cups which are often employed for that purpose. Prior to painting the repaired portion of a vehicle in a body shop, the repairer must mix-up a batch of paint of the required colour, matching the colour of the surrounding portion of the vehicle. The various components for a batch of paint should be measured accurately, either by volume or by weight, into a suitable receptacle in which they are mixed together thoroughly before being used. If the mixing is less than thorough, or if the receptacle is not absolutely clean, the colour/quality of the batch of paint (and, consequently, the quality of the repair) may be affected.

To enable paint mixing to be carried out conveniently, but effectively, a liner of the type illustrated in FIG. 19 can be used with a measuring vessel 70 as shown in FIG. 23. The measuring vessel 70 is in the form of a pitcher having a spout 71 in a shaped rim 72 and a handle 73. The pitcher is provided with markings 74 on the side walls, enabling the volume of the contents of the pitcher to be determined. Using the method already described with reference to FIG. 21, liners of the type shown in FIG. 19 can be produced to fit accurately inside the pitcher 70 and, by utilizing such a liner, the various components for a batch of paint can be assembled and mixed together in the pitcher 70 without actually coming into contact with the latter.

A liner 75 suitable for use in the pitcher 70 is illustrated in FIG. 24. The liner 75 has a shape corresponding to the interior of the pitcher 70 and is generally similar to the liner 13 illustrated in FIG. 19 except that the thicker, outwardly-extending, rim portion 14 of the latter is omitted and the side walls 76 of the liner 75 include a shaped rim 77 corresponding to the rim 72 and spout 71 of the pitcher. Because the liner 75 fits the inside of the pitcher 70 exactly, the possibility that it will be punctured by the mixing implement when paint is being mixed in the pitcher is minimized. In addition, because there are no locations in the interior of the liner in which material can become trapped, there is no barrier to the effective mixing of all the material that is measured into the pitcher. When the paint has been mixed and transferred from the pitcher 70 (for example, to the paint pot of a spray gun), the liner 75 is removed, preferably collapsed as shown in FIG. 20, and thrown away, leaving the pitcher 70 clean and ready for further use.

Because the base 78 of the liner 75 will occupy some space at the bottom of the pitcher 70, the markings 74 on the side walls of the pitcher may need to be positioned to take account of that fact. It may also be desirable, depending on the shape of the pitcher 70, to provide an extension at the top of the liner 75 which can be folded back over the rim 72 of the pitcher. Alternatively, or in addition, it may be desirable to seal the liner 75 to the pitcher 70 during use, for example by providing some form of shaping on the liner and the pitcher so that they can be snap-fitted together at the rims 77, 72.

Although it is desirable that the liner 75 of the pitcher 70 should be collapsible so that it occupies less space after use, that is not absolutely essential. Moreover, since the shape of the liner 75 is determined by the shape of the interior of the receptacle 70 in which it is to be used, there may be cases in which the liner is not capable of standing, unsupported, outside the receptacle.

As a further alternative, an article of the type shown in FIG. 19 can be used simply as a container in which case it has the advantage that, although the walls 13B are comparable in flexibility to a plastic bag, the container will stand upright, without support, while it is being filled and also afterwards. The container can be of any appropriate size and can be used to contain many different types of items, including for example powders and liquids, or simply as an alternative to the plastic/paper bags provided to customers by retailers. In each case, the container has the advantage that there are no internal locations in which material within the container can become trapped. Depending on the contents of the container, it may be desirable to be able to close the container mouth, in which case some appropriate form of closure can be provided. The closure may, for example take the form of an internal rib on the inside of the container around one half of the mouth, and a mating groove also on the inside of the container around the other half of the mouth into which the rib can be pressed to close the container. The flexibility of the container walls 13B additionally allows the walls to be pressed down around the contents, thereby reducing the air space within the container if required.

After use, when it is required to dispose of the container, the side walls 13B can be collapsed by hand by pushing the rim 14 towards the base so that the container (now in the form illustrated in FIG. 20) requires less space for disposal. As already mentioned, the side walls 13B collapse in a similar fashion to a plastic bag without being ruptured (e.g. by splitting, tearing or cracking).

It will be appreciated that there are many other possible uses for articles of the type shown in FIG. 19. A liner of that type could, for example, be used simply as a liner for a refuse bin where it would offer the advantage of being a better fit inside the bin than a conventional bag-shaped liner, and of being easier to handle when removed from the bin because it will stand upright on the base 13A. Similar liners could also be used in buckets or other containers for materials that harden comparatively quickly (for example glue, wax or plaster): in some cases, material such as plaster is actually sold together with a mixing bucket, in which case a supply of liners could be included in the package. In some circumstances, it might be appropriate to have a plurality of liners, stacked one inside another, in position inside a receptacle so that when one liner is removed the next is already in position. Moreover, since the receptacle is intended to contain a liner, it is not essential for the walls of the receptacle to be solid: the receptacle could, for example, have the form of a framework for containing the liner.

Generally, in an article of the type shown in FIG. 19, the base 13A is typically at least 25 µm thick, more typically at least 100 µm thick. The side walls 13B are thin in comparison to the base 13A, to the extent that they can be collapsed as described to facilitate disposal of the liner/container: typically, the thickness of the side walls 13B is less than half the thickness of the base 13A and may be less than one fifth the thickness of the base. Depending on the materials used, and the intended use of the liner/container, the side walls 13A will usually be less than 250 µm thick.

For certain uses of an article of the type shown in FIG. 19, the rim portion 14 may not be essential and can be omitted (as in the liner of FIG. 24). If no rim 14 is required the sheet 60 of FIG. 21(c) would, of course, be trimmed immediately adjacent the mouth of the moulded portion 65. It has been found that the self-supporting nature of the liner/container can be retained even if the rim portion 14 is omitted.

It should also be noted that the base 13A of a container/liner of the type shown in FIG. 19 need not be circular but could have another shape, for example rectangular or triangular. In the case of a liner for a receptacle, that shape may be dictated by the shape of the receptacle particularly if the liner is required to fit the interior of the latter. In some cases, the base need not be rigid.

It will further be appreciated that the process illustrated in FIGS. 21 and 22 is not restricted to the production of liners for use in the paint pots of spray guns and can be adapted to produce liners/containers for other purposes. It will be appreciated that the process requires the mould 64 to have a slightly tapered shape with the largest cross-section being at the lower end (as seen in FIGS. 21 and 22) to allow the sheet 60 to be removed when the forming operation is complete. When the process is used to produce of a liner which is required to fit inside a container, that, in turn, requires that the container should be similarly tapered internally. The liner/container may be formed from any suitable thermoplastic material capable of forming a thin film which is impervious to the materials it is intended to contain. In some cases, it may be desirable to use a material which is in the form of a laminate. For certain applications, such as food packaging, plastics with a low gas-permeability may be preferred. For most applications, however, polyolefins such as polyethylene or polypropylene are preferred since these are relatively inexpensive, are readily thermo-formable, and are inert to most aqueous and organic fluids.

What is claimed is:

1. A method of preparing a gravity fed liquid spraying apparatus comprising the steps of:
    a) providing a disposable plastic container having a base and sidewalls, or a sidewall, extending from the base to an open end;
    b) with the container standing upright on the base, adding liquid to the container through the open end, the liquid being visible through the container;
    c) attaching to the container a lid having an outlet, the combination of the lid and container comprising a reservoir;
    d) connecting a spray gun to the outlet of the lid;
    e) inverting the combination of the spray gun and reservoir so that the reservoir is above the spray gun;
    f) opening an air hole in the container; and
    g) closing the air hole upon completion of spraying, inverting the combination of spray gun and reservoir so that the spray gun is above the reservoir and disconnecting the spray gun from the outlet.

2. The method of claim 1 further comprising the step of:
    h) sealing the reservoir to store unused liquid.

3. The method of claim 1 further comprising locating a filter in the lid to filter liquid withdrawn from the reservoir in use.

4. The method of claim 1 wherein the container has markings to enable the volume of the liquid in the container to be determined.

5. The method of claim 1 further comprising, before disconnecting the spray gun from the outlet, the step of re-inverting the combination of the spray gun and reservoir so that the reservoir is above the spray gun and activating the spray gun to drain liquid remaining in the spray gun back into the reservoir.

* * * * *

UNITED STATES PATENT AND TRADEMARK OFFICE
CERTIFICATE OF CORRECTION

PATENT NO.         : 7,798,421 B2                                    Page 1 of 1
APPLICATION NO.    : 11/932511
DATED              : September 21, 2010
INVENTOR(S)        : Stephen Christopher Joseph It is certified that error appears in the above-identified patent and that said Letters Patent is hereby corrected as shown below:

Page 3, Column 2, Under "Other Publications",
Line 24, delete "DeVilbuss" and insert -- DeVilbiss --.
Line 26, delete "DeVibiss" and insert -- DeVilbiss --.

Column 4,
Line 33, delete "13," and insert -- 13; --.

Signed and Sealed this
Fifteenth Day of February, 2011

David J. Kappos
*Director of the United States Patent and Trademark Office*